(12) United States Patent
Wang et al.

(10) Patent No.: US 11,301,141 B2
(45) Date of Patent: Apr. 12, 2022

(54) OPTIMIZED SELECTION OF SUBSET OF STORAGE DEVICES FOR DATA BACKUP

(71) Applicant: EMC IP Holding Company LLC, Hopkinton, MA (US)

(72) Inventors: Qi Wang, Shanghai (CN); Zhen Jia, Shanghai (CN); Yun Zhang, Shanghai (CN); Ren Wang, Shanghai (CN); Jing Yu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 21 days.

(21) Appl. No.: 17/039,955

(22) Filed: Sep. 30, 2020

(65) Prior Publication Data

US 2022/0043581 A1 Feb. 10, 2022

(30) Foreign Application Priority Data

Aug. 7, 2020 (CN) .......................... 202010788767.0

(51) Int. Cl.
  *G06F 12/00* (2006.01)
  *G06F 3/06* (2006.01)
  *G06F 11/14* (2006.01)
  *G06F 11/34* (2006.01)

(52) U.S. Cl.
  CPC .......... *G06F 3/0613* (2013.01); *G06F 3/0605* (2013.01); *G06F 3/0641* (2013.01); *G06F 3/0683* (2013.01); *G06F 11/1448* (2013.01); *G06F 11/3428* (2013.01)

(58) Field of Classification Search
  CPC .... G06F 3/0613; G06F 3/0605; G06F 3/0641; G06F 3/0683; G06F 3/0646; G06F 3/0647; G06F 3/065; G06F 11/1448; G06F 11/1458; G06F 11/3428
  See application file for complete search history.

(56) References Cited

U.S. PATENT DOCUMENTS

| | | | |
|---|---|---|---|
| 10,896,198 B2 * | 1/2021 | Asadi | G06F 16/27 |
| 2006/0209682 A1 * | 9/2006 | Filsfils | H04L 45/28 370/219 |
| 2015/0160889 A1 * | 6/2015 | Beeson | G06F 3/0619 711/114 |

* cited by examiner

*Primary Examiner* — Shawn X Gu
(74) *Attorney, Agent, or Firm* — Chamberlain, Hrdlicka, White, Williams & Aughtry

(57) ABSTRACT

Embodiments of the present disclosure provide a storage management method, an electronic device, and a computer program product. The method includes: determining, in a storage device set, a plurality of candidate subsets of storage devices used for data backup, wherein the plurality of candidate subsets include substantially the same number of storage devices. The method further includes: determining global balance degrees respectively corresponding to the plurality of candidate subsets, wherein the global balance degree indicates a usage balance degree of the storage device set when storage devices in a corresponding candidate subset are used for data backup. The method further includes: determining a target subset of storage devices for data backup in the plurality of candidate subsets based on the global balance degrees.

20 Claims, 9 Drawing Sheets

OPTIMIZED SELECTION OF SUBSET OF STORAGE DEVICES FOR DATA BACKUP

CROSS-REFERENCE TO RELATED APPLICATIONS

This application claims priority to Chinese Patent Application No. 2020107887670 filed on Aug. 7, 2020. Chinese Patent Application No. 2020107887670 is hereby incorporated by reference in its entirety.

TECHNICAL FIELD

Embodiments of the present disclosure generally relate to computer systems or storage systems, and more particularly, to a storage management method, an electronic device, and a computer program product.

BACKGROUND

Today, many companies or enterprises generate large amounts of data every day. For data security, data protection becomes more and more important. In this regard, a backup storage system can provide data protection. It can copy data to be backed up to a plurality of storage devices, thereby obtaining a plurality of data copies stored in different storage devices.

In conventional solutions, a user of a backup storage system selects a storage device for storing data copies and determines related routing plans. In other words, the user needs to manually select and specify one or more storage devices for each piece of data (or data source) to be backed up as a storage destination of data copies. However, this may be complicated and cumbersome for the user, and the rationality of the selected storage device cannot be guaranteed, thereby causing the performance of the backup storage system to decrease.

SUMMARY OF THE INVENTION

The embodiments of the present disclosure propose a technical solution for determining a subset of storage devices for data backup in a storage device set, and specifically provide a storage management method, an electronic device, and a computer program product.

In a first aspect of the present disclosure, a storage management method is provided. The method includes: determining, in a storage device set, a plurality of candidate subsets of storage devices used for data backup, wherein the plurality of candidate subsets include substantially the same number of storage devices. The method further includes: determining global balance degrees respectively corresponding to the plurality of candidate subsets, wherein the global balance degree indicates a usage balance degree of the storage device set when storage devices in a corresponding candidate subset are used for data backup. The method further includes: determining a target subset of storage devices for data backup in the plurality of candidate subsets based on the global balance degrees.

In a second aspect of the present disclosure, an electronic device is provided. The electronic device includes at least one processor and at least one memory storing computer program instructions. The at least one memory and the computer program instructions are configured to cause, along with the at least one processor, the electronic device to: determine, in a storage device set, a plurality of candidate subsets of storage devices used for data backup, wherein the plurality of candidate subsets include substantially the same number of storage devices. The at least one memory and the computer program instructions are also configured to cause, along with the at least one processor, the electronic device to: determine global balance degrees respectively corresponding to the plurality of candidate subsets, wherein the global balance degree indicates a usage balance degree of the storage device set when storage devices in a corresponding candidate subset are used for data backup. The at least one memory and the computer program instructions are further configured to cause, along with the at least one processor, the electronic device to: determine a target subset of storage devices for data backup in the plurality of candidate subsets based on the global balance degrees.

In a third aspect of the present disclosure, a computer program product is provided. The computer program product is tangibly stored on a non-volatile computer-readable medium and includes machine-executable instructions. The machine-executable instructions, when executed, cause a machine to execute steps of the method according to the first aspect.

It should be understood that the content described in the summary part is neither intended to limit key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, a plurality of embodiments of the present disclosure are shown by way of example and not limitation.

Throughout all the accompanying drawings, the same or similar reference numerals are used to indicate the same or similar components.

DETAILED DESCRIPTION

Figure 1:
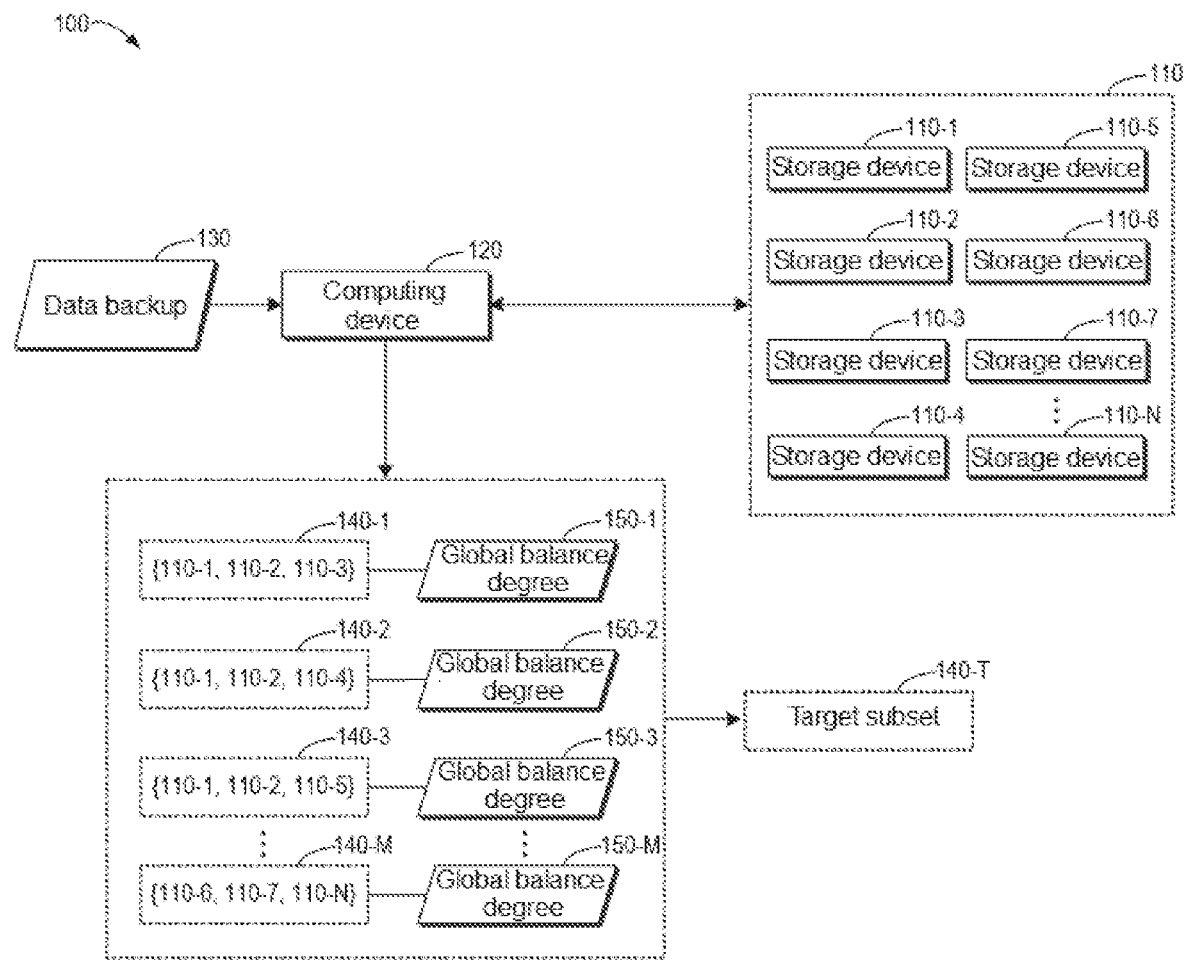
FIG. 1 shows a schematic diagram of an example storage system in which the embodiments of the present disclosure may be implemented.

The principles and spirit of the present disclosure will be described below with reference to a plurality of example embodiments shown in the accompanying drawings. It should be understood that these embodiments are described only for the purpose of enabling a person skilled in the art to better understand and then implement the present disclosure, instead of limiting the scope of the present disclosure in any way. In the description and claims herein, unless otherwise defined, all technical and scientific terms used herein have meanings that are commonly understood by those of ordinary skill in the art to which the present disclosure belongs.

As mentioned above, in conventional solutions, a user of a backup storage system selects a storage device used to store data copies and determines related routing plans. In other words, the user needs to manually select and specify one or more storage devices for each piece of data (or data source) to be backed up as a storage destination of data copies. However, this may be complicated and cumbersome for the user, and the rationality of the selected storage device cannot be guaranteed, thereby causing the performance of the backup storage system to decrease.

Specifically, a user-specified service level agreement (SLA) may require a plurality of data copies to be respectively copied to a plurality of storage devices located in different geographic locations. In addition, due to the need for disaster recovery of data in the event of a disaster, governments and enterprises have also established regulations on data protection. For example, in order to cope with natural disasters such as earthquake, typhoon, and flood which may cause simultaneous damage to a plurality of storage devices that store data copies, these regulations have some other requirements for the storage devices used for data backup. These requirements may include that a distance between the storage devices as well as a distance between each storage device and a data generator need to be greater than a specified distance.

Therefore, in the process of selecting storage devices for data backup, a user may need to collect and consider various related parameters. For example, when creating a backup strategy for data backup, a user may need to select a storage device for data backup based on these related parameters. To this end, the user may need to first understand the geographic location of each storage device, a distance between the storage devices, the network bandwidth between a data source and the storage devices, the remaining storage capacity of each storage device, and so on. It can be seen that in the above process, there are many operations that need to be manually completed by the user. This is obviously complicated and cumbersome for the user. When there are a large number of optional storage devices, it may be difficult for the user to quickly select storage devices that meet the requirements.

In addition, it may be more critical that the selected storage devices may not be the best choice because the selection of the storage devices is manually completed by the user. For example, due to a low network bandwidth, the storage devices selected by the user may fail to store some data copies, or the copying of data copies to the storage devices may be canceled. For another example, storing data copies to the storage devices selected by the user may cause an imbalance in use of storage resources of a storage device set. For example, some storage devices in the storage device set may be nearly full, while other storage devices may still have a large amount of storage capacities. If the use of storage devices is to be balanced manually, the user may need additional manpower to monitor various parameters of the storage devices.

In view of the foregoing problems and other potential problems in conventional solutions, the embodiments of the present disclosure propose a technical solution for determining a subset of storage devices for data backup in a storage device set. In the embodiments of the present disclosure, for data backup for which a storage device is to be determined, a computing device may determine a plurality of candidate subsets of storage devices in a storage device set. Next, the computing device may determine a plurality of global balance degrees respectively corresponding to the plurality of candidate subsets. Then, the computing device may determine a target subset of storage devices for data backup in the plurality of candidate subsets based on the plurality of global balance degrees. Through the embodiments of the present disclosure, a storage system can automatically select a subset of storage devices for data backup from a storage device set for storing data copies without manual operation, and at the same time, the entire storage device set can have relatively high global balance degrees, thereby improving the automation level and performance of the storage system.

FIG. 1 shows a schematic diagram of example storage system 100 in which the embodiments of the present disclosure may be implemented. As shown in FIG. 1, example storage system 100 may include storage device set 110. Storage device set 110 may include N storage devices, namely, storage device 110-1, storage device 110-2, storage device 110-3, storage device 110-4, storage device 110-5, storage device 110-6, storage device 110-7, . . . , and storage device 110-N, where N is a positive integer. In some embodiments, storage devices 110-1 to 110-N in storage device set 110 may be mainly used to back up data, that is, to store data copies. In this case, example storage system 100 may be a backup storage system used to store data copies. Of course, in other embodiments, storage devices 110-1 to 110-N may also be used to store any other data, information, or content. Therefore, example storage system 100 may be a storage system for any other purpose or function, but may also be used to store data copies.

In some embodiments, one or more of storage devices 110-1 to 110-N may be individual physical storage devices, that is, separate physical storage devices. In another embodiment, one or more of storage devices 110-1 to 110-N may also be a combination of a plurality of physical storage devices. For example, any storage device among storage devices 110-1 to 110-N may refer to a combination of a plurality of individual physical storage devices, such as a set of all physical storage devices at a certain storage site. In other words, in some embodiments, one or more of storage devices 110-1 to 110-N may refer to one or more storage sites, rather than physical storage devices, and each storage site may correspond to a backup storage system.

In some embodiments, one or more of storage devices 110-1 to 110-N may be respectively located in a plurality of geographical locations far away from each other, for example, located in different continents, different countries, different cities, and so on. Of course, in other embodiments, one or more of storage devices 110-1 to 110-N may also be located in approximately the same geographic location, for example, in the same city, the same building, the same room, etc. In other words, the embodiments of the present disclosure do not have any restrictions on the geographic locations of storage devices 110-1 to 110-N, and are equally applicable to situations where storage devices 110-1 to 110-N are respectively located in any possible geographic locations.

In addition, example storage system 100 may include computing device 120 for controlling and managing example storage system 100. For example, computing device 120 may copy data that needs to be backed up to one or more storage devices in storage device set 110, process access requests for the data (such as data copies) stored in storage devices 110-1 to 110-N, organize and manage the data stored in storage devices 110-1 to 110-N, control and access other devices or components in example storage system 100, and so on. More generally, computing device 120 may implement any computing function, control function, processing function, and/or similar functions related to example storage system 100. In some embodiments, computing device 120 may be a main control device of example storage system 100, which is mainly used to control the functions of example storage system 100.

In other embodiments, computing device 120 may also be a computing device of a certain client terminal of example storage system 100, which is mainly used to control functions of the client terminal, but may be coupled with a control device of example storage system 100 in a communication manner to realize the data backup function. In other embodiments, computing device 120 may be any computing device associated with example storage system 100. In addition, it should be noted that various processing or operations performed by computing device 120 described herein may also be completed by a plurality of computing devices separately, that is, each computing device may implement some of these processing or operations, and these computing devices may be located in different geographic locations or belong to different entities.

As shown in FIG. 1, when there is data backup 130 for which a backup storage device is to be allocated, computing device 120 may determine one or more storage devices in storage device set 110 for storing data copies associated with data backup 130. The one or more storage devices are also referred to as target subset 140-T of storage devices used for data backup 130. That is, computing device 120 will determine which storage device or storage devices among storage devices 110-1 to 110-N are used for data backup 130. In some embodiments, data backup 130 may specifically refer to a data backup task or event, which may be generated or created by example storage system 100 for a certain data source. For example, a user of example storage system 100 may instruct data backup 130 for the data source, or example storage system 100 may trigger data backup 130 for the data source according to a preset data backup trigger condition. In some embodiments, the data source may be a client terminal in example storage system 100, which may generate data to be backed up. The user of example storage system 100 may store the data (for example, data copies) to one or more storage devices in storage device set 110 through the client terminal, and may read the data copies from the storage devices storing the data copies through the client terminal. In other embodiments, the data source may be any device or entity capable of generating data.

In the example of FIG. 1, in order to reasonably select target subset 140-T for data backup 130 in storage device set 110, computing device 120 may first determine M candidate subsets of storage devices for data backup 130, that is, candidate subset 140-1, candidate subset 140-2, candidate subset 140-3, . . . , and candidate subset 140-M, where M is a positive integer. Then, computing device 120 may determine global balance degrees 150-1 to 150-M corresponding to candidate subsets 140-1 to 140-M respectively. In the embodiments of the present disclosure, each of global balance degrees 150-1 to 150-M may indicate a usage balance degree of storage device set 110 in the case where storage devices in a corresponding candidate subset are used for data backup 130. For example, without loss of generality, global balance degree 150-1 may indicate the usage balance degree of storage device set 110 when storage devices 110-1 to 110-3 in candidate subset 140-1 are used for data backup 130. Next, computing device 120 may determine target subset 140-T in the plurality of candidate subsets 140-1 to 140-M based on global balance degrees 150-1 to 150-M. For example, computing device 120 may use a candidate subset with a high global balance as target subset 140-T, so as to optimize the usage balance degree of storage device set 110.

It should be noted that the "usage balance degree" herein may refer to the balance degree of "usage" of the plurality of storage devices in any aspect. For example, the "usage balance degree" may refer to the "usage balance degree" of available storage capacities of the plurality of storage devices, the "usage balance degree" of input network bandwidths of the plurality of storage devices, the "usage balance degree" of processing resources of the plurality of storage devices, the "usage balance degree" of memory resources of the plurality of storage devices, and so on. However, it will be understood that the embodiments of the present disclosure are equally applicable to the "usage balance degree" of the plurality of storage devices in any other aspect. In addition, it should be noted that although candidate subsets 140-1 to 140-M in FIG. 1 are depicted as each including three storage devices, the depiction is only illustrative and is not intended to limit the scope of the present disclosure in any way. In other embodiments, candidate subsets 140-1 to 140-M may include the same number of storage devices or different numbers of storage devices, and each candidate subset may include any number of storage devices.

In some embodiments, computing device 120 may include any device capable of implementing computing functions and/or control functions, including but not limited to, special-purpose computers, general-purpose computers, general-purpose processors, microprocessors, microcontrollers, or state machines. Computing device 120 may also be implemented as an individual computing device or a combination of computing devices, for example, a combination of a digital signal processor (DSP) and a microprocessor, a plurality of microprocessors, one or more microprocessors combined with a DSP core, or any other such configurations. In addition, it should be pointed out that in the context of the present disclosure, computing device 120 may also be referred to as electronic device 120, and these two terms may be used interchangeably herein.

In some embodiments, storage devices 110-1 to 110-N may be any device or system having a storage capability and capable of providing a storage service or function, including but not limited to, a backup storage site, a cloud storage system, a hard disk drive (HDD), a solid state disk (SSD), a removable disk, a compact disk (CD), a laser disk, an optical disk, a digital versatile disk (DVD), a floppy disk, a Blu-ray disk, a serial-attached small computer system Interface (SCSI) storage disk (SAS), a serial advanced technology attachment (SATA) storage disk, any other magnetic storage devices and any other optical storage devices, or any combination thereof.

In some embodiments, the data source or client terminal herein may refer to any device that can generate data and receive data storage services. In some embodiments, such devices include, but are not limited to, personal computers, tablet computers, laptop computers, notebook computers, netbook computers, any other types of computers, cellular phones or smart phones, media player devices, e-book devices, mobile WiFi devices, wearable computing devices, wireless devices, mobile devices, user equipment, and any other types of electronic computing devices.

In some embodiments, communication links between various components in example storage system 100 may be any form of connection or coupling that can achieve data communication or control signal communication between these components, including but not limited to, coaxial cables, fiber-optic cables, twisted pairs, or wireless technology (such as infrared, radio, and microwaves). In some embodiments, the communication links may also include, but are not limited to, network cards, hubs, modems, repeaters, bridges, switches, routers, and other devices used for network connection, as well as various network connection lines, wireless links, etc. In some embodiments, the communication links may include various types of buses. In other embodiments, the communication links may include computer networks, communication networks, or other wired or wireless networks.

It should be understood that FIG. 1 only schematically shows units, elements, modules, or components related to the embodiments of the present disclosure in example storage system 100. In practice, example storage system 100 may also include other units, elements, modules, or components for other functions. In addition, the specific number of units, elements, modules, or components shown in FIG. 1 is only illustrative, and is not intended to limit the scope of the present disclosure in any way. In other embodiments, example storage system 100 may include any suitable number of storage devices, computing devices, data backups, candidate subsets, global balance degrees, target subsets, and so on. Accordingly, the embodiments of the present disclosure are not limited to the specific devices, units, elements, modules, or components depicted in FIG. 1, but are generally applicable to any storage environment with a data backup function. An example storage management method of an embodiment of the present disclosure will be described below with reference to FIG. 2.

Figure 2:
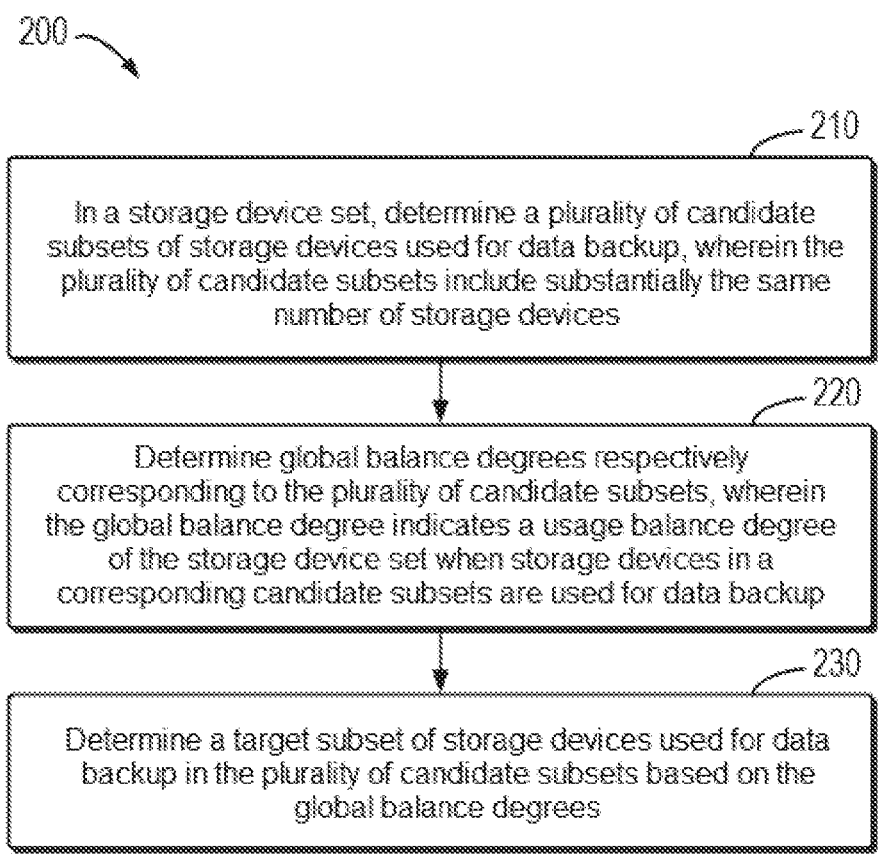
FIG. 2 shows a flowchart of an example storage management method according to an embodiment of the present disclosure.

FIG. 2 shows a flowchart of example storage management method 200 according to an embodiment of the present disclosure. In some embodiments, example method 200 may be implemented by computing device 120 in example storage system 100, for example, may be implemented by a processor or processing unit of computing device 120, or implemented by various functional modules of computing device 120. In other embodiments, example method 200 may also be implemented by a computing device independent of example storage system 100, or may be implemented by other units or modules in example storage system 100. To facilitate discussion, example method 200 will be described in conjunction with FIG. 1.

At block 210, for data backup 130 for which a storage device is to be allocated, computing device 120 may determine a plurality of candidate subsets 140-1 to 140-M of storage devices in storage device set 110. Generally speaking, each of candidate subsets 140-1 to 140-M may include different numbers of storage devices. For example, this means that data backup 130 does not have requirements for the number of data copies. That is, data associated with data backup 130 may be backed up to any number (from 1 to N) of storage devices at the same time. In this case, there may be a candidate subset including only one storage device in candidate subsets 140-1 to 140-M, or there may be a candidate subset including all storage devices 110-1 to 110-N, or there may be a candidate subset including another number (between 1 and N) of storage devices.

In some embodiments, in order to make each candidate subset provide substantially the same degree of data protection (i.e., substantially the same number of data copies), and also to have a relatively high comparability between the candidate subsets, computing device 120 may make candidate subsets 140-1 to 140-M include substantially the same number of storage devices. For example, this means that no matter which candidate subset is finally selected by computing device 120 for data backup 130, substantially the same data security will be achieved for the data associated with data backup 130. It should be noted that the number "substantially the same" here can mean that the numbers of storage devices included in different candidate subsets are roughly the same, but it does not exclude one or more candidate subsets including slightly more or fewer storage devices.

More quantitatively, in some embodiments, the "substantially the same" number of storage devices in two candidate subsets can be interpreted as that a ratio of the difference between the numbers of storage devices in the two candidate subsets to the total number of storage devices in storage device set 110 is smaller than a predetermined threshold. As an example, assuming that storage device set 110 includes 100 storage devices, the difference between the numbers of storage devices in two candidate subsets is not larger than 5, that is, it can be considered that the numbers of storage devices are "substantially the same." In other words, the predetermined threshold in this example is set to 5%. However, it should be understood that the predetermined threshold 5% listed here is only illustrative and is not intended to limit the scope of the present disclosure in any way. In other embodiments, the predetermined threshold may be set reasonably according to specific technical environment, application scenarios, and performance requirements.

In other embodiments, candidate subsets 140-1 to 140-M may each include the same number of storage devices. As an example, FIG. 1 depicts candidate subsets 140-1 to 140-M as each including 3 storage devices. That is to say, assuming that each storage device can store one data copy associated with data backup 130, candidate subsets 140-1 to 140-M can all store three data copies associated with data backup 130. Therefore, in such an embodiment, computing device 120 may select candidate subsets 140-1 to 140-M in storage device set 110 based on the number of data copies required for data backup 130. For example, assuming that data backup 130 requires three data copies, computing device 120 may determine $C_N^3$ the number of all possible combinations of candidate subsets in storage device set 110, that is, $M=C_N^3$. Of course, in other embodiments, the number M of candidate subsets 140-1 to 140-M may also be smaller than the number CA of all possible combinations, and such examples will be described below with reference to FIGS. 3 and 4.

Figure 3:
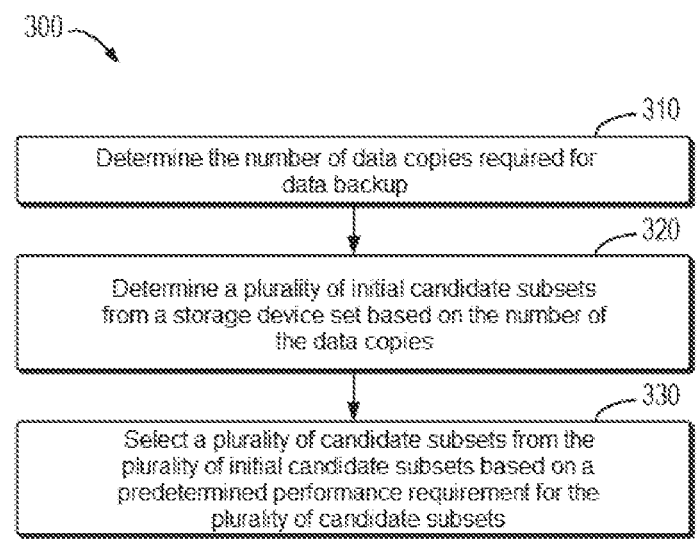
FIG. 3 shows an example process of determining a plurality of candidate subsets in a storage device set according to an embodiment of the present disclosure.

FIG. 3 shows example process 300 of determining a plurality of candidate subsets 140 in storage device set 110 according to an embodiment of the present disclosure. In some embodiments, example process 300 may be implemented by computing device 120 in example storage system 100, for example, may be implemented by a processor or processing unit of computing device 120, or implemented by various functional modules of computing device 120. In other embodiments, example process 300 may also be implemented by a computing device independent of example storage system 100, or may be implemented by other units or modules in example storage system 100.

Figure 4:
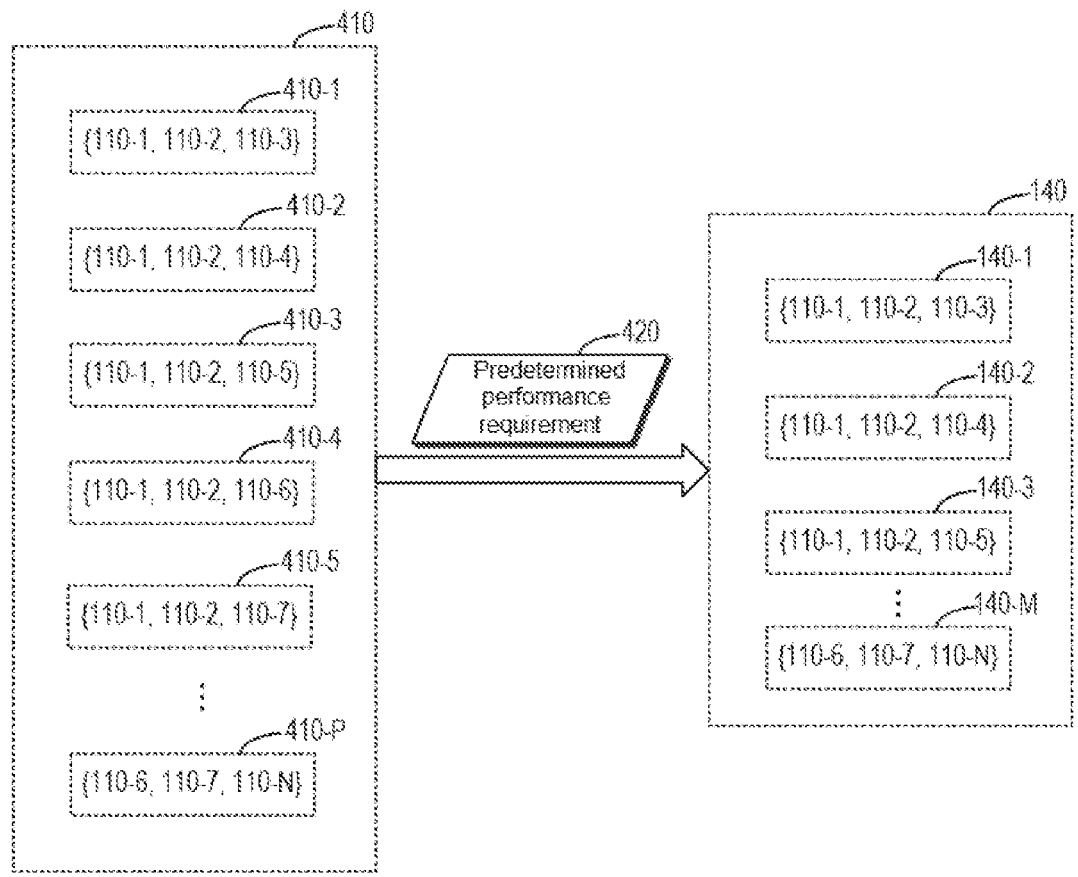
FIG. 4 shows a schematic diagram of selecting a plurality of candidate subsets in a plurality of initial candidate subsets based on a predetermined performance requirement according to an embodiment of the present disclosure.

FIG. 4 shows a schematic diagram of selecting a plurality of candidate subsets 140 in a plurality of initial candidate subsets 410 based on predetermined performance requirement 420 according to an embodiment of the present disclosure. As shown in FIG. 4, computing device 120 may first determine a plurality of initial candidate subsets 410 in storage device set 110, and then select a plurality of candidate subsets 140 from the plurality of initial candidate subsets 410 based on predetermined performance requirement 420. In this way, computing device 120 may exclude candidate subsets that do not meet predetermined performance requirement 420 from initial candidate subsets 410, thereby ensuring that finally determined target subset 140-T will meet predetermined performance requirement 420.

Specifically, referring to FIG. 3, at block 310, computing device 120 may determine the number of data copies required for data backup 130. In some embodiments, the number of data copies required for data backup 130 may be input by a user of example storage system 100. For example, the user may set the required number of data copies when setting service level agreement (SLA) parameters of data backup 130. In the example of FIG. 1, without loss of generality, it is assumed that the number of data copies set by the user for data backup 130 is 3. It should be understood that the embodiments of the present disclosure are equally applicable to situations where data backup 130 requires any number of data copies.

At block 320, computing device 120 may determine a plurality of initial candidate subsets 410-1 to 410-P from storage device set 110 based on the number of data copies required for data backup 130, where P is a positive integer. In some embodiments, the number of storage devices in each of initial candidate subsets 410-1 to 410-P may be equal to the number of data copies required for data backup 130, that is, each storage device may store one data copy. In this way, computing device 120 can simplify the operation of determining initial candidate subsets 410-1 to 410-P while meeting the requirement for the number of data copies of data backup 130. Specifically, according to the number of data copies required for data backup 130, computing device 120 may determine all possible storage device combinations in storage device set 110 as initial candidate subsets 410-1 to 410-P. For example, in the case where the number of data copies is three, computing device 120 may determine $C_N^3$ initial candidate subsets 410-1 to 410-P, that is, $P=C_N^3$. In other embodiments, computing device 120 may also determine initial candidate subsets 410-1 to 410-P, of which the number P is less than CA. For example, there may be currently unavailable storage devices in storage device set 110, so computing device 120 may exclude combinations including the unavailable storage devices from initial candidate subsets 410-1 to 410-P.

In other embodiments, the number of storage devices in each of initial candidate subsets 410-1 to 410-P may also be different from the number of data copies required for data backup 130. For example, computing device 120 may add a predetermined number of storage devices on the basis of the number of data copies required for data backup 130 to provide more data copies to data backup 130, thereby enhancing protection of the data associated with data backup 130. As an example, assuming that the number of data copies required for data backup 130 is 3, computing device 120 may determine the number of storage devices in each initial candidate subset to be 4, thereby actually providing 4 data copies to the data related to data backup 130. It will be understood that the various specific numbers listed here are only illustrative and are not intended to limit the scope of the present disclosure in any way. In other embodiments, computing device 120 may add any number of increments to the required number of data copies to determine the number of storage devices of each initial candidate subset.

At block 330, after determining initial candidate subsets 410-1 to 410-P, computing device 120 may, based on predetermined performance requirement 420 for candidate subsets 140-1 to 140-M, select candidate subsets 140-1 to 140-M from initial candidate subsets 410-1 to 410-P. For example, in the example of FIG. 4, computing device 120 may exclude initial candidate subsets 410-4 and 410-5 from initial candidate subsets 410-1 to 410-P because they do not meet predetermined performance requirement 420, thereby selecting candidate subsets 140-1 to 140-M.

Generally speaking, predetermined performance requirement 420 may be any performance requirement preset for storage devices or storage device combinations in candidate subsets 140-1 to 140-M. In some embodiments, predetermined performance requirement 420 may be that a distance between any two storage devices in each of candidate subsets 140-1 to 140-M is greater than a threshold distance. Therefore, if computing device 120 determines that a distance between two storage devices is less than the threshold distance, computing device 120 may exclude initial candidate sets including these two storage devices from initial candidate subsets 410-1 to 410-P. As an example, the threshold distance may be 100 kilometers. This threshold distance can ensure that storage devices in each candidate subset have different physical environments, thus reducing the possibility of simultaneous failures (for example, power outage, flood, mechanical shock, etc.) of different storage devices. It will be understood that specific numerical values of the threshold distance listed here are only illustrative and are not intended to limit the scope of the present disclosure in any way. In other embodiments, the threshold distance may be set to any value according to specific technical environments and performance requirements.

Additionally or alternatively, predetermined performance requirement 420 may be that the amount of available resources of any storage device in candidate subset 140 is greater than a threshold amount of resources, thereby ensuring that any of candidate subsets 140-1 to 140-M can complete data backup 130. For example, the amount of available resources here may include the amount of computing resources, the amount of memory resources, storage capacities, network bandwidths, etc. of the storage devices. Therefore, if computing device 120 determines that the amount of available resources of a certain (or some) storage device(s) is less than the threshold amount of resources, computing device 120 may exclude initial candidate subsets including such storage device(s) from initial candidate subsets 410-1 to 410-P. In some embodiments, the threshold amount of resources here may be set by computing device 120 based on the amount of resources required for data backup 130. Of course, in other embodiments, the threshold amount of resources may also be predetermined according to specific technical environments and performance requirements.

As can be seen from the above description, through example process 300, computing device 120 may comprehensively and efficiently determine candidate subsets 140-1 to 140-M meeting predetermined performance requirement 420 from storage device set 110 based on the number of data copies required for data backup 130.

Referring back to FIG. 2, at block 220, computing device 120 may determine global balance degrees 150-1 to 150-M corresponding to the plurality of candidate subsets 140-1 to 140-M respectively. As described above, the global balance degree may indicate the usage balance degree of storage device set 110 in the case where storage devices in a corresponding candidate subset are used for data backup 130. Without loss of generality, taking global balance degree 150-1 of candidate subset 140-1 as an example, global balance degree 150-1 may refer to the usage balance degree of storage device set 110 in the case where storage devices 110-1, 110-2, and 110-3 in candidate subset 140-1 are used for data backup 130. Hereinafter, an example in which computing device 120 determines global balance degree 150-1 will be illustratively described. It will be understood that computing device 120 may use a similar manner to determine global balance degrees 150-2 to 150-M corresponding to candidate subsets 140-2 to 140-M respectively.

Therefore, in some embodiments, in order to determine global balance degree 150-1, computing device 120 may assume that storage devices 110-1, 110-2, and 110-3 are used for data backup 130, and then computing device 120 may determine usage metrics of storage devices 110-1 to 110-N in storage device set 110 one by one, that is, a metric of the usage degree of each storage device. As used herein, the "usage metric" may refer to a metric of the usage degree of a storage device in any aspect, for example, a metric of the usage degree of available storage capacity, a metric of the usage degree of input network bandwidth, a metric of the usage degree of computing resources, a metric of the usage degree of memory resources, etc. In addition, since storage devices 110-1 to 110-N are mainly used to store data, the data increase speed of a certain storage device may generally reflect the usage degree of the storage device.

After obtaining the usage metrics of storage devices 110-1 to 110-N, computing device 120 may determine global balance degree 150-1 of storage device set 110 based on these usage metrics. For example, computing device 120 may calculate a standard deviation of the usage metrics of storage devices 110-1 to 110-N as global balance degree 150-1 of storage device set 110. Of course, in other embodiments, computing device 120 may also use other similar statistical indicators (for example, variance) of the usage metrics of storage devices 110-1 to 110-N as global balance degree 150-1 of storage device set 110. More generally, computing device 120 may adopt any index that can reflect the balance of usage metrics of storage devices 110-1 to 110-N as global balance degree 150-1 of storage device set 110.

In some embodiments, in the process of determining global balance degree 150-1, since candidate subset 140-1 is assumed to be used for data backup 130 and storage devices 110-4 to 110-N out of candidate subset 140-1 are assumed not to be used for data backup 130, computing device 120 may use different methods to determine "usage metrics" of the storage devices for storage devices 110-1 to 110-3 and storage devices 110-4 to 110-N. Specifically, computing device 120 may divide storage devices 110-1 to 110-N into two groups according to whether the storage devices belong to candidate subset 140-1, and then respectively determine two groups of usage metrics for the two groups of storage devices. Such an example will be described later with reference to FIGS. 5 and 6.

In addition, it should be noted that the "usage balance degree" of storage device set 110 mentioned herein may refer to the balance degree of "usages" of various storage devices in storage device set 110 in any aspect. For example, the "usage balance degree" may refer to the "usage balance degree" of available storage capacities of various storage devices in storage device set 110, or the "usage balance degree" of input network bandwidths of various storage devices in storage device set 110. Therefore, computing device 120 may accordingly determine "usage metrics" of the available storage capacities or input network bandwidths of the storage devices. Such an example will be described later with reference to FIGS. 9 to 12 and FIGS. 14 to 15. However, it will be understood that the embodiments of the present disclosure are equally applicable to the "usage balance degree" of various storage devices in storage device set 110 in any other aspect.

Still referring to FIG. 2, at block 230, after determining global balance degrees 150-1 to 150-M respectively corresponding to candidate subsets 140-1 to 140-M, computing device 120 may determine target subset 140-T of storage devices used for data backup 130 in the plurality of candidate subsets 140-1 to 140-M based on global balance degrees 150-1 to 150-M. For example, computing device 120 may use a candidate subset with a high global balance degree as target subset 140-T, thereby optimizing the usage balance degree of storage device set 110. Specifically, in some embodiments, computing device 120 may determine a target global balance degree higher than a threshold balance degree in global balance degrees 150-1 to 150-M. As an example, the threshold balance degree here may be selected by computing device 120 after determining global balance degrees 150-1 to 150-M, such as an average value of global balance degrees 150-1 to 150-M. For another example, the threshold balance degree may also be preset according to specific technical environments and performance requirements.

In some cases, computing device 120 may determine that a plurality of global balance degrees are higher than the threshold balance degree. At the moment, computing device 120 may randomly select a global balance degree from these global balance degrees as the target global balance degree. Then, computing device 120 may determine a candidate subset corresponding to the target global balance degree as target subset 140-T. For example, assuming that global balance degrees 150-2 and 150-3 in the example of FIG. 1 are both higher than the threshold balance degree and computing device 120 randomly selects global balance degree 150-3 as the target global balance degree, candidate subset 140-3 corresponding to global balance degree 150-3 may be determined as target subset 140-T. In this way, computing device 120 may ensure that the global balance degree of target subset 140-T is relatively high among all global balance degrees 150-1 to 150-M, thereby optimizing the performance of example storage system 100.

In some embodiments, since computing device 120 has determined global balance degrees 150-1 to 150-M, computing device 120 may select the highest global balance degree among global balance degrees 150-1 to 150-M as the target global balance degree. For example, assuming that global balance degree 150-3 is the highest among global balance degrees 150-1 to 150-M in the example of FIG. 1, computing device 120 may select global balance degree 150-3 as the target global balance degree, so candidate subset 140-3 corresponding to global balance degree 150-3 may be determined as target subset 140-T. In this way, computing device 120 may ensure that the global balance degree of target subset 140-T is the highest among all global balance degrees 150-1 to 150-M, thereby making the performance of example storage system 100 optimal.

Through example storage management method 200, computing device 120 may automatically select target subset 140-T of storage devices for data backup 130 from storage device set 110 for storing data copies without manual operation, and at the same time, this enables entire storage device set 110 to have a relatively high global balance degree, thereby improving the automation level and performance of example storage system 100.

As mentioned above when describing block 220 of FIG. 2, in order to determine global balance degree 150-1 corresponding to candidate subset 140-1, computing device 120 may divide storage devices 110-1 to 110-N into two groups according to whether the storage devices belong to candidate subset 140-1, and then two groups of usage metrics are respectively determined for the two groups of storage devices. Such an example will be described below with reference to FIGS. 5 and 6. It should be noted that in the following description, an example process of determining first global balance degree 150-1 by computing device 120 is exemplified. It will be appreciated that computing device 120 may similarly determine global balance degrees 150-2 to 150-M corresponding to candidate subsets 140-2 to 140-M.

Figure 5:
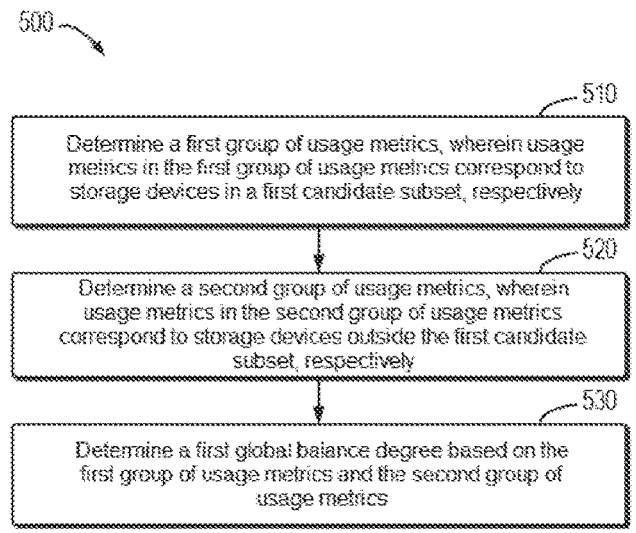
FIG. 5 shows an example process of determining a first global balance degree corresponding to a first candidate subset according to an embodiment of the present disclosure.

FIG. 5 shows example process 500 of determining first global balance degree 150-1 corresponding to first candidate subset 140-1 according to an embodiment of the present disclosure. In some embodiments, example process 500 may be implemented by computing device 120 in example storage system 100, for example, may be implemented by a processor or processing unit of computing device 120, or implemented by various functional modules of computing device 120. In other embodiments, example process 500 may also be implemented by a computing device independent of example storage system 100, or may be implemented by other units or modules in example storage system 100.

Figure 6:
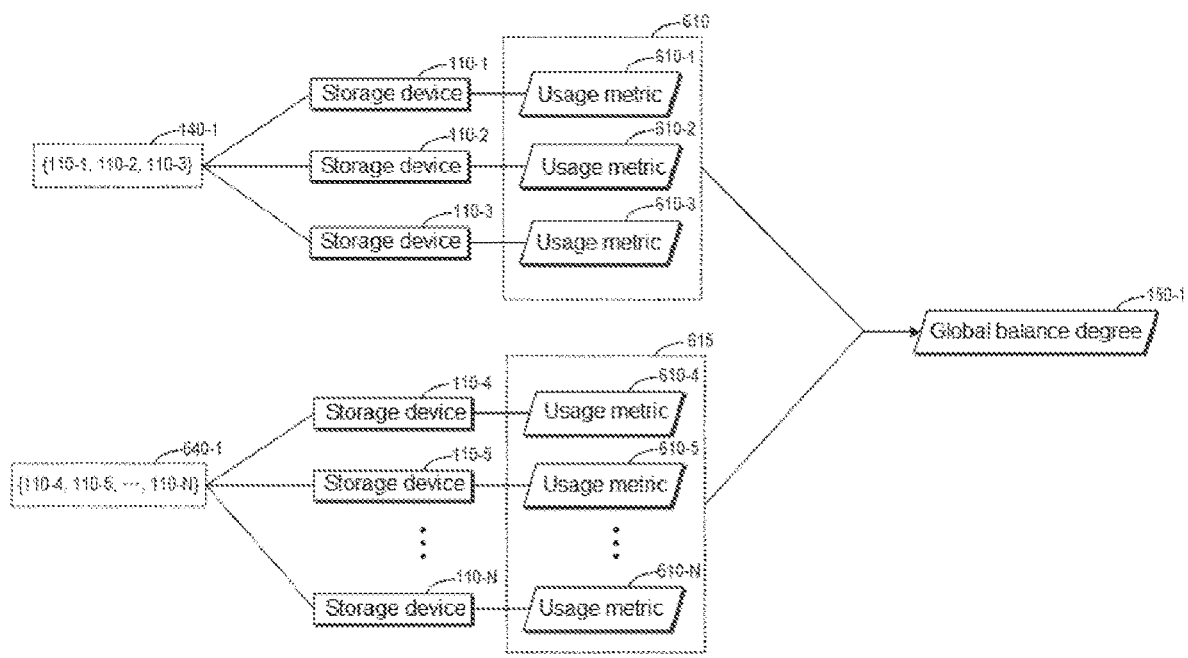
FIG. 6 shows a schematic diagram of determining a first global balance degree corresponding to a first candidate subset according to an embodiment of the present disclosure.

FIG. 6 shows a schematic diagram of determining first global balance degree 150-1 corresponding to first candidate subset 140-1 according to an embodiment of the present disclosure. As shown in FIG. 6, since first candidate subset 140-1 is assumed to be used for data backup 130, storage device set 110 may be divided into two parts. One part is storage devices in first candidate subset 140-1, and the other part is storage devices outside first candidate subset 140-1, that is, a complementary set of first candidate subset 140-1, which may be referred to as first complementary set 640-1 below. Regarding first candidate subset 140-1 and first complementary set 640-1, computing device 120 may use different methods to determine usage metrics of the storage devices, wherein the usage metrics associated with storage devices in first candidate subset 140-1 may be referred to as first group of usage metrics 610, and the usage metrics associated with storage devices in first complementary set 640-1 may be referred to as second group of usage metrics 615. Then, computing device 120 may derive first global balance degree 150-1 based on first group of usage metrics 610 and second group of usage metrics 615.

Specifically, referring to FIG. 5, at block 510, computing device 120 may determine first group of usage metrics 610, and the usage metrics in first group of usage metrics 610 respectively correspond to storage devices in first candidate subset 140-1. For example, in the example of FIG. 6, first candidate subset 140-1 includes storage devices 110-1, 110-2, and 110-3. Therefore, first group of usage metrics 610 may include usage metric 610-1 of storage device 110-1, usage metric 610-2 of storage device 110-2, and usage metric 610-3 of storage device 110-3. That is, computing device 120 may determine respective usage metrics 610-1, 610-2, and 610-3 of storage devices 110-1, 110-2, and 110-3 respectively.

As mentioned above, in the embodiments of the present disclosure, the "usage metric" may refer to a metric of the usage degree of a storage device in any aspect, for example, a metric of the usage degree of available storage capacity, a metric of the usage degree of input network bandwidth, a metric of the usage degree of computing resources, a metric of the usage degree of memory resources, etc. For another example, since the "usage metric" herein is for a storage device, and the storage device is mainly used to store data, the data increase speed of the storage device may generally indicate the usage degree of the storage device. Therefore, in general, computing device 120 may determine usage metrics 610-1, 610-2, and 610-3 in first group of usage metrics 610 by determining the degrees to which storage devices 110-1, 110-2, and 110-3 are used in any aspect. In some embodiments, computing device 120 may determine first group of usage metrics 610 based on the data increase speeds of storage devices 110-1, 110-2, and 110-3 in first candidate subset 140-1. Such an embodiment will be described later with reference to FIGS. 7 and 8.

At block 520, computing device 120 may determine second group of usage metrics 615. The usage metrics in second group of usage metrics 615 respectively correspond to the storage devices outside first candidate subset 140-1, that is, the storage devices in first complementary set 640-1. For example, in the example of FIG. 6, first complementary set 640-1 includes storage devices 110-4, 110-5, . . . , and 110-N. Therefore, second group of usage metrics 615 may include usage metric 610-4 of storage device 110-4, usage metric 610-5 of storage device 110-5, . . . , and usage metric 610-N of storage device 110-N. That is, computing device 120 may determine respective usage metrics 610-4 to 610-N of storage devices 110-4 to 110-N respectively.

Similar to the manner of determining first group of usage metrics 610, computing device 120 may determine usage metrics 610-4 to 610-N in second group of usage metrics 615 by determining the degrees to which storage devices 110-4 to 110-N are used in any aspect. In some embodiments, computing device 120 may determine second group of usage metrics 615 based on the data increase speeds of storage devices 110-4 to 110-N in first complementary set 640-1. Such an embodiment will be described later with reference to FIG. 13.

At block 530, after determining first group of usage metrics 610 and second group of usage metrics 615, computing device 120 may determine first global balance degree 150-1 based on first group of usage metrics 610 and second group of usage metrics 615. For example, computing device 120 may calculate a standard deviation of usage metrics 610-1 to 610-N of storage devices 110-1 to 110-N as global balance degree 150-1. Of course, in other embodiments, computing device 120 may also use other similar statistical indicators (for example, variance) of usage metrics 610-1 to 610-N of storage devices 110-1 to 110-N as global balance degree 150-1. More generally, computing device 120 may use any index that can reflect the balance of usage metrics 610-1 to 610-N of storage devices 110-1 to 110-N as global balance degree 150-1.

Through example process 500, computing device 120 may determine the usage metrics of the storage devices differently according to whether the storage devices are used for data backup 130, and then obtain corresponding global balance degrees. In this way, the calculation accuracy and effectiveness of the usage metrics of the storage devices may be improved, so that the calculation accuracy and effectiveness of corresponding global balance degrees are also improved.

As mentioned above when describing block 510 of FIG. 5, in some embodiments, computing device 120 may determine first group of usage metrics 610 based on the data increase speeds of storage devices 110-1, 110-2, and 110-3 in first candidate subset 140-1. Hereinafter, referring to FIGS. 7 and 8, such an embodiment will be described by taking first usage metric 610-1 in first group of usage metrics 610 as an example. As mentioned above, first usage metric 610-1 corresponds to first storage device 110-1 in first candidate subset 140-1, that is, first usage metric 610-1 is the usage metric of first storage device 110-1. It should be noted that computing device 120 may determine usage metric 610-2 of storage device 110-2 and usage metric 610-3 of storage device 110-3 in a similar manner as described below with reference to FIGS. 7 and 8, thereby determining first group of usage metrics 610.

Figure 7:
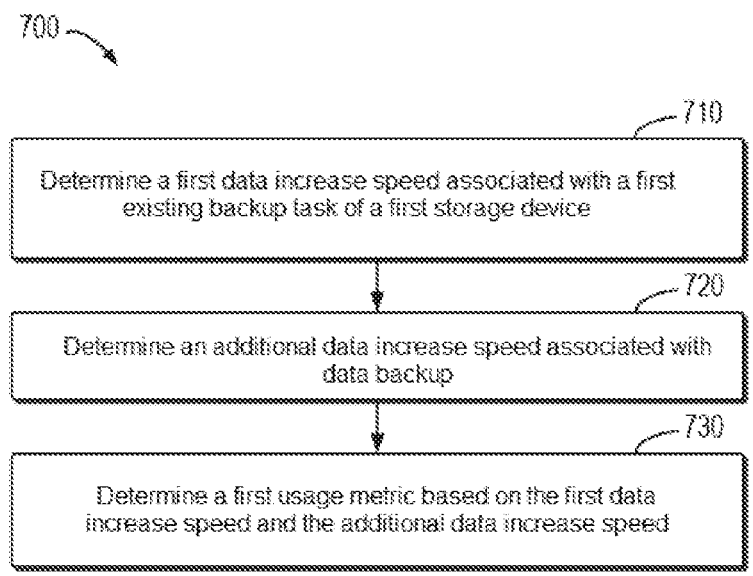
FIG. 7 shows an example process of determining a first usage metric corresponding to a first storage device according to an embodiment of the present disclosure.

FIG. 7 shows example process 700 of determining first usage metric 610-1 corresponding to first storage device 110-1 according to an embodiment of the present disclosure. In some embodiments, example process 700 may be implemented by computing device 120 in example storage system 100, for example, may be implemented by a processor or processing unit of computing device 120, or implemented by various functional modules of computing device 120. In other embodiments, example process 700 may also be implemented by a computing device independent of example storage system 100, or may be implemented by other units or modules in example storage system 100.

Figure 8:
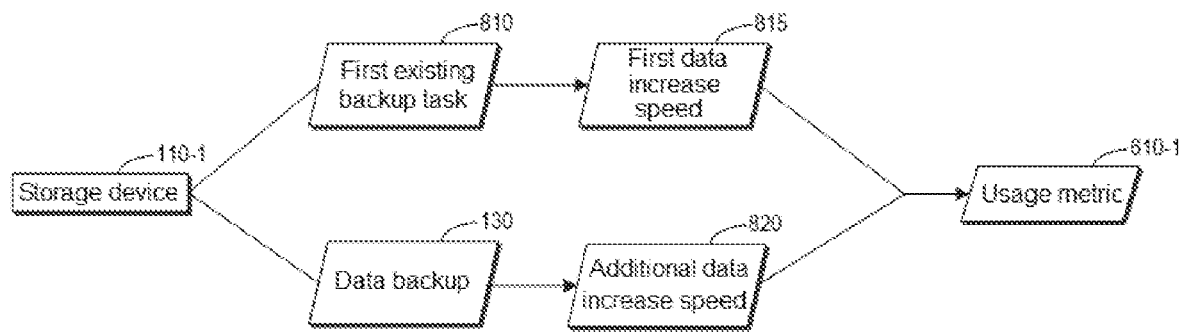
FIG. 8 shows a schematic diagram of determining a first usage metric corresponding to a first storage device according to an embodiment of the present disclosure.

FIG. 8 shows a schematic diagram of determining first usage metric 610-1 corresponding to first storage device 110-1 according to an embodiment of the present disclosure. As shown in FIG. 8, before computing device 120 determines target subset 140-T of storage devices for data backup 130, first storage device 110-1 may already have an existing backup task, which may be referred to as first existing backup task 810 hereinafter. Therefore, assuming that first candidate subset 140-1 is used for data backup 130, in order to calculate first usage metric 610-1 of first storage device 110-1, computing device 120 needs to consider both first existing backup task 810 and data backup 130. Of course, in some embodiments, there may be a plurality of existing backup tasks on first storage device 110-1. In such a case, computing device 120 may process these existing backup tasks in a manner similar to that for first existing backup task 810.

Referring to FIG. 7, at block 710, computing device 120 may determine first data increase speed 815 associated with first existing backup task 810 of first storage device 110-1. Generally speaking, computing device 120 may determine first data increase speed 815 in any suitable manner. For example, in some embodiments, computing device 120 may directly search for relevant configuration parameters (for example, the size of data to be backed up per unit time) of first existing backup task 810, thereby obtaining first data increase speed 815. In other embodiments, computing device 120 may obtain first data increase speed 815 based on historical statistics or empirical values. For example, computing device 120 may calculate the data increase speed (for example, the amount of data increased per day) of first existing backup task 810 in the past unit time, thereby estimating first data increase speed 815.

In another embodiment, computing device 120 may determine first data increase speed 815 based on the backup data size, data increase rate, and data deduplication rate of first existing backup task 810. As an example, it is assumed that the backup data size of first existing backup task 810 each time is 1000 GB, which may be an empirical value or an estimated value. In addition, it is assumed that the recovery point objective (RPO) of first existing backup task 810 is 4 hours, that is, backup needs to be performed 6 times a day, and the difference rate between two data copies to be backed up twice successively may be 5%, which may be an empirical value or an estimated value. Furthermore, it is assumed that the data deduplication rate of first existing backup task 810 is 50 times, which may also be an empirical value or an estimated value. Based on this, the data increase rate of first existing backup task 810 may be estimated as 6/day×5%=0.3/day. Furthermore, in this example, first data increase speed 815 may be calculated as 1000 GB×0.3/day×⅟₅₀=6 GB/day. In this way, computing device 120 may estimate first data increase speed 815 relatively accurately. It should be understood that specific values of the various parameters listed here are only illustrative and are not intended to limit the scope of the present disclosure in any way. In other embodiments, the backup data size, data increase rate, and data deduplication rate of the existing backup task may be any appropriate values.

At block 720, computing device 120 may determine additional data increase speed 820 associated with data backup 130. Generally speaking, computing device 120 may determine additional data increase speed 820 in any suitable manner. For example, in some embodiments, computing device 120 may directly search for related configuration parameters (for example, the size of data to be backed up per unit time) of data backup 130, thereby obtaining additional data increase speed 820. In other embodiments, computing device 120 may obtain additional data increase speed 820 based on empirical values. For example, computing device 120 may estimate additional data increase speed 820 through related information of a data source that causes data backup 130. In another embodiment, computing device 120 may determine additional data increase speed 820 based on the backup data size, data increase rate, and data deduplication rate of data backup 130. In this way, computing device 120 may estimate additional data increase speed 820 relatively accurately. The specific determination method may be similar to the related description of the backup data size, data increase rate, and data deduplication rate of first existing backup task 810 above, and details are not described herein again.

At block 730, computing device 120 may determine first usage metric 610-1 of first storage device 110-1 based on first data increase speed 815 and additional data increase speed 820. Since first storage device 110-1 is mainly used to store data, and first data increase speed 815 and additional data increase speed 820 indicate the amount of data to be stored in first storage device 110-1 per unit time, the above speeds can reflect the degree to which first storage device 110-1 is used. Based on this, in some embodiments, computing device 120 may directly use the sum of first data increase speed 815 and additional data increase speed 820 as first usage metric 610-1. In other embodiments, in order to more accurately reflect the usage degree of first storage device 110-1 in a certain aspect, computing device 120 may further consider other parameters of first storage device 110-1 to determine first usage metric 610-1. Such an embodiment will be described below with reference to FIGS. 9 to 12.

Through example process 700, computing device 120 may respectively quantitatively determine first data increase speed 815 and the additional data increase speed caused by first existing backup task 810 and data backup 130 on first storage device 110-1, and then determine first usage metric 610-1 of first storage device 110-1. In this way, the calculation accuracy and effectiveness of first usage metric 610-1 of first storage device 110-1 may be improved.

Figure 9:
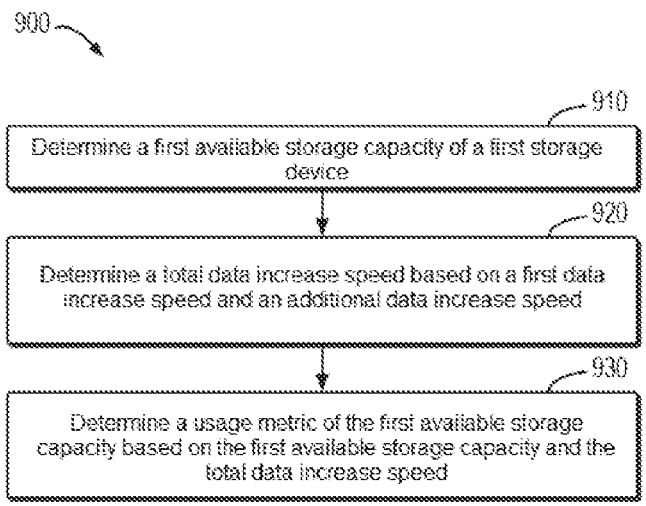
FIG. 9 shows an example process of determining a usage metric of a first available storage capacity corresponding to a first storage device according to an embodiment of the present disclosure.

FIG. 9 shows example process 900 of determining a usage metric of a first available storage capacity corresponding to first storage device 110-1 according to an embodiment of the present disclosure. In some embodiments, example process 900 may be implemented by computing device 120 in example storage system 100, for example, may be implemented by a processor or processing unit of computing device 120, or implemented by various functional modules of computing device 120. In other embodiments, example process 900 may also be implemented by a computing device independent of example storage system 100, or may be implemented by other units or modules in example storage system 100.

Figure 10:
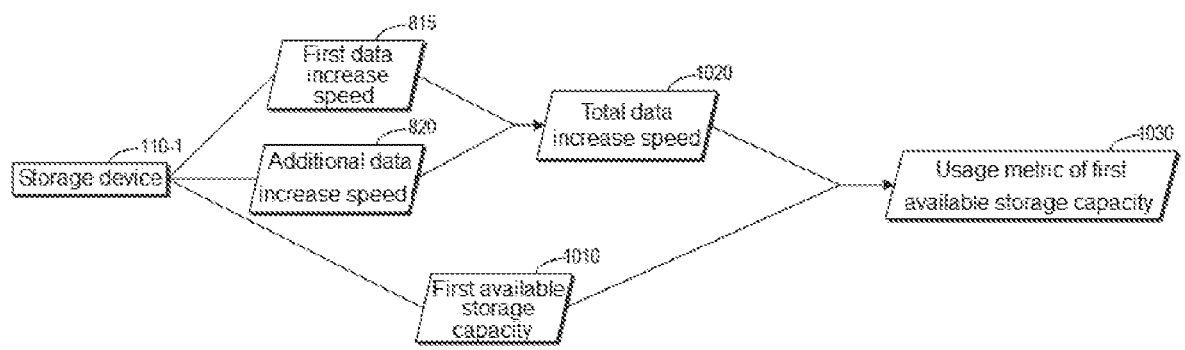
FIG. 10 shows a schematic diagram of determining a usage metric of a first available storage capacity corresponding to a first storage device according to an embodiment of the present disclosure.

FIG. 10 shows a schematic diagram of determining usage metric 1030 of first available storage capacity 1010 corresponding to first storage device 110-1 according to an embodiment of the present disclosure. As shown in FIG. 10, as an example way of determining first usage metric 610-1, based on first data increase speed 815 and additional data increase speed 820, computing device 120 may further consider first available storage capacity 1010 of first storage device 110-1 to determine usage metric 1030 of first available storage capacity 1010 of first storage device 110-1. Example process 900 of FIG. 9 is described below with reference to FIG. 10.

At block 910, computing device 120 may determine first available storage capacity 1010 of first storage device 110-1. For example, computing device 120 may directly obtain, through searching, first available storage capacity 1010 of first storage device 110-1. Of course, computing device 120 may also adopt any other appropriate method to obtain first available storage capacity 1010 of first storage device 110-1, which is not limited in the embodiment of the present disclosure.

At block 920, computing device 120 may determine total data increase speed 1020 based on first data increase speed 815 and additional data increase speed 820. It will be understood that total data increase speed 1020 indicates the total amount of data to be stored in first storage device 110-1 per unit time, and therefore generally reflects the degree to which first storage device 110-1 is used. On the basis of total data increase speed 1020, computing device 120 may combine other parameters of first storage device 110-1 to further calculate the usage degree of first storage device 110-1 in a certain aspect.

At block 930, computing device 120 may determine usage metric 1030 of first available storage capacity 1010 based on first available storage capacity 1010 and total data increase speed 1020. For example, computing device 120 may divide first available storage capacity 1010 by total data increase speed 1020, thereby estimating after how long the available storage capacity of first storage device 110-1 will be used up, that is, how soon first storage device 110-1 will be filled up. It should be understood that the time length parameter reflects the degree to which first storage device 110-1 is used in the aspect of available storage capacity. In some embodiments, in the case where total data increase speed 1020 changes, in order to make the time length parameter and the usage degree of first storage device 110-1 in other aspects have the same change direction (for example, simultaneously increasing as total data increase speed 1020 increases, or simultaneously decreasing as total data increase speed 1020 decreases), computing device 120 may also use the reciprocal of the aforementioned time length parameter to indicate the degree to which first storage device 110-1 is used in the aspect of available storage capacity.

Through example process 900, computing device 120 may quantitatively determine usage metric 1030 of first available storage capacity 1010 of first storage device 110-1 based on total data increase speed 1020 and first available storage capacity 1010. In this way, the calculation accuracy and effectiveness of the usage degree of first storage device 110-1 in the aspect of available storage capacity may be improved.

Figure 11:
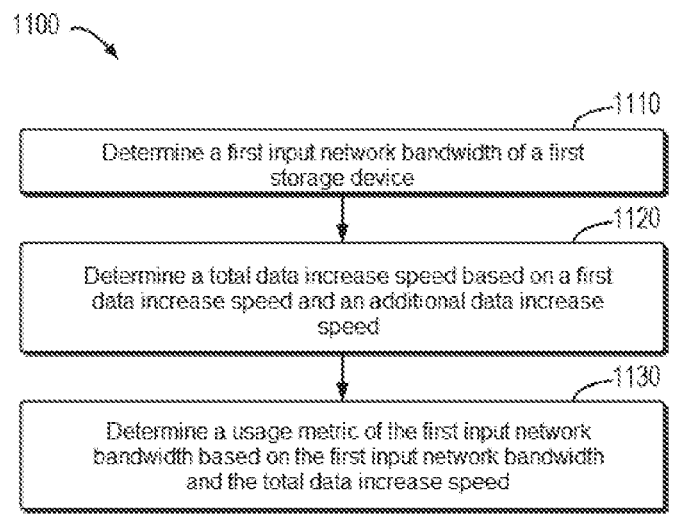
FIG. 11 shows an example process of determining a usage metric of a first input network bandwidth corresponding to a first storage device according to an embodiment of the present disclosure.

FIG. 11 shows example process 1100 of determining a usage metric of a first input network bandwidth corresponding to first storage device 110-1 according to an embodiment of the present disclosure. In some embodiments, example process 1100 may be implemented by computing device 120 in example storage system 100, for example, may be implemented by a processor or processing unit of computing device 120, or implemented by various functional modules of computing device 120. In other embodiments, example process 1100 may also be implemented by a computing device independent of example storage system 100, or may be implemented by other units or modules in example storage system 100.

Figure 12:
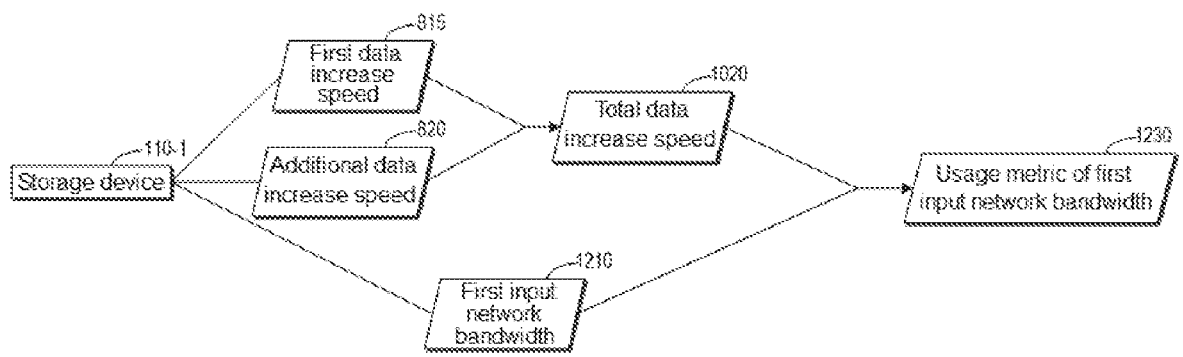
FIG. 12 shows a schematic diagram of determining a usage metric of a first input network bandwidth corresponding to a first storage device according to an embodiment of the present disclosure.

FIG. 12 shows a schematic diagram of determining usage metric 1230 of first input network bandwidth 1210 corresponding to first storage device 110-1 according to an embodiment of the present disclosure. As shown in FIG. 12, as an example way of determining first usage metric 610-1, based on first data increase speed 815 and additional data increase speed 820, computing device 120 may further consider first input network bandwidth 1210 of first storage device 110-1 to determine usage metric 1230 of first input network bandwidth 1210 of first storage device 110-1. Example process 1100 of FIG. 11 is described below with reference to FIG. 12.

At block 1110, computing device 120 may determine first input network bandwidth 1210 of first storage device 110-1. For example, computing device 120 may directly obtain, through searching, first input network bandwidth 1210 of first storage device 110-1. Of course, computing device 120 may also use any other appropriate method to obtain first input network bandwidth 1210 of first storage device 110-1, which is not limited in the embodiment of the present disclosure.

At block 1120, computing device 120 may determine total data increase speed 1020 based on first data increase speed 815 and additional data increase speed 820. It will be understood that total data increase speed 1020 indicates the total amount of data to be stored in first storage device 110-1 per unit time, and therefore generally reflects the degree to which first storage device 110-1 is used. On the basis of total data increase speed 1020, computing device 120 may combine other parameters of first storage device 110-1 to further calculate the usage degree of first storage device 110-1 in a certain aspect.

At block 1130, computing device 120 may determine usage metric 1230 of first input network bandwidth 1210 based on first input network bandwidth 1210 and total data increase speed 1020. For example, computing device 120 may divide total data increase speed 1020 by first input network bandwidth 1210, thereby estimating a network bandwidth usage rate of first storage device 110-1, that is, what percentage of the network bandwidth of first storage device 110-1 will be used. It will be understood that the network bandwidth usage rate parameter reflects the degree to which first storage device 110-1 is used in the aspect of input network bandwidth.

In some embodiments, in the case where total data increase speed 1020 changes, the network bandwidth usage rate and the reciprocal of the time length parameter described above may increase simultaneously as total data increase speed 1020 increases, or decrease simultaneously as total data increase speed 1020 decreases. Therefore, in these embodiments, the network bandwidth usage rate and the reciprocal of the time length parameter may be used in combination to evaluate the usage degree of first storage device 110-1, that is, first usage metric 610-1.

Through example process 1100, computing device 120 may quantitatively determine usage metric 1230 of first input network bandwidth 1210 of first storage device 110-1 based on total data increase speed 1020 and first input network bandwidth 1210. In this way, the calculation accuracy and effectiveness of the usage degree of first storage device 110-1 in the aspect of input network bandwidth may be improved.

As mentioned above when describing block 520 of FIG. 5, in some embodiments, computing device 120 may determine second group of usage metrics 615 based on the data increase speeds of storage devices 110-4 to 110-N in first complementary set 640-1. Hereinafter, referring to FIG. 13, such an embodiment will be described by taking second usage metric 610-4 in second group of usage metrics 615 as an example. As mentioned above, second usage metric 610-4 corresponds to second storage device 110-4 outside first candidate subset 140-1, that is, second usage metric 610-4 is the usage metric of second storage device 110-4. It should be noted that computing device 120 may determine usage metrics 610-5 to 610-N of storage devices 110-5 to 110-N in a similar manner as described below with reference to FIG. 13, thereby determining second group of usage metrics 615.

Figure 13:
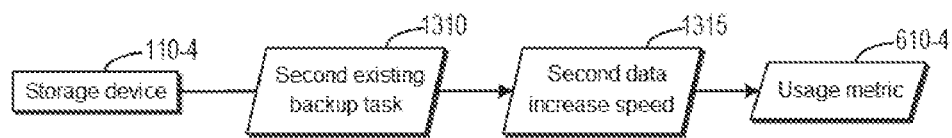
FIG. 13 shows a schematic diagram of determining a second usage metric corresponding to a second storage device according to an embodiment of the present disclosure.

FIG. 13 shows a schematic diagram of determining second usage metric 610-4 corresponding to second storage device 110-4 according to an embodiment of the present disclosure. As shown in FIG. 13, before computing device 120 determines target subset 140-T of storage devices for data backup 130, second storage device 110-4 may already have an existing backup task, which may be referred to herein as second existing backup task 1310. Therefore, assuming that first candidate subset 140-1 is used for data backup 130, second storage device 110-4 will not be used for data backup 130, and in order to calculate second usage metric 610-4 of second storage device 110-4, computing device 120 only needs to consider second existing backup task 1310. Of course, in some embodiments, there may be a plurality of existing backup tasks on second storage device 110-4. In this case, computing device 120 may process these existing backup tasks in a manner similar to that for second existing backup task 1310.

Referring to FIG. 13, in order to determine second usage metric 610-4, computing device 120 may determine second data increase speed 1315 associated with second existing backup task 1310 of second storage device 110-4. Generally speaking, computing device 120 may determine second data increase speed 1315 in any suitable manner. For example, in some embodiments, computing device 120 may directly search for related configuration parameters (for example, the size of data to be backed up per unit time) of second existing backup task 1310, thereby obtaining second data increase speed 1315. In other embodiments, computing device 120 may obtain second data increase speed 1315 based on historical statistics or empirical values. For example, computing device 120 may calculate the data increase speed (for example, the amount of data increased per day) of second existing backup task 1310 in the past unit time, thereby estimating second data increase speed 1315.

In another embodiment, computing device 120 may determine second data increase speed 1315 based on the backup data size, data increase rate, and data deduplication rate of second existing backup task 1310. In this way, computing device 120 may estimate second data increase speed 1315 relatively accurately. The specific determination method may be similar to the related description of the backup data size, data increase rate, and data deduplication rate of first existing backup task 810 above, and details are not described herein again.

After determining second data increase speed 1315, computing device 120 may determine second usage metric 610-4 of second storage device 110-4 based on second data increase speed 1315. Since second storage device 110-4 is mainly used to store data and second data increase speed 1315 indicates the amount of data to be stored in second storage device 110-4 per unit time, second data increase speed 1315 reflects the degree to which second storage device 110-4 is used. Based on this, in some embodiments, computing device 120 may directly use second data increase speed 1315 as second usage metric 610-4. In other embodiments, in order to more accurately reflect the usage degree of second storage device 110-4 in a certain aspect, computing device 120 may further consider other parameters of second storage device 110-4 to determine second usage metric 610-4. Such an embodiment will be described below with reference to FIGS. 14 to 15.

Through the example way shown in FIG. 13, computing device 120 may quantitatively determine second data increase speed 1315 caused by second existing backup task 1310 on second storage device 110-4, and then determine second usage metric 610-4 of second storage device 110-4. In this way, the calculation accuracy and effectiveness of second usage metric 610-4 of second storage device 110-4 may be improved.

Figure 14:
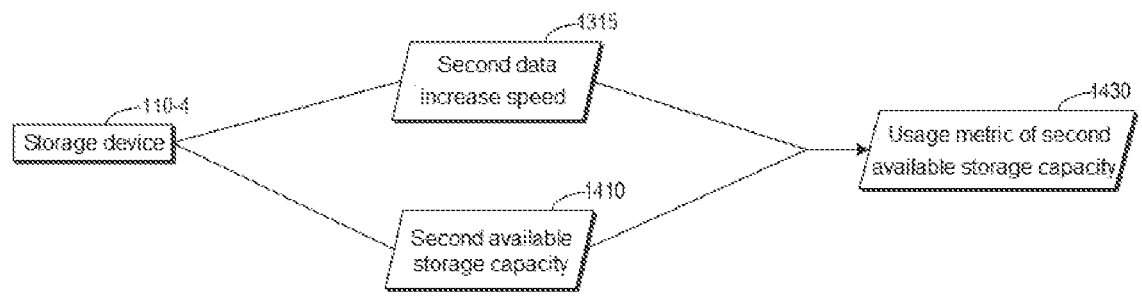
FIG. 14 shows a schematic diagram of determining a usage metric of a second available storage capacity corresponding to a second storage device according to an embodiment of the present disclosure.

FIG. 14 shows a schematic diagram of determining usage metric 1430 of second available storage capacity 1410 corresponding to second storage device 110-4 according to an embodiment of the present disclosure. As shown in FIG. 14, as an example way of determining second usage metric 610-4, on the basis of second data increase speed 1315, computing device 120 may further consider second available storage capacity 1410 of second storage device 110-4 to determine usage metric 1430 of second available storage capacity 1410 of second storage device 110-4.

Specifically, computing device 120 may determine second available storage capacity 1410 of second storage device 110-4. For example, computing device 120 may directly obtain, through searching, second available storage capacity 1410 of second storage device 110-4. Of course, computing device 120 may also use any other appropriate method to obtain second available storage capacity 1410 of second storage device 110-4, which is not limited in the embodiment of the present disclosure.

On the other hand, second data increase speed 1315 indicates the amount of data to be stored in second storage device 110-4 per unit time, and therefore generally reflects the degree to which second storage device 110-4 is used. On the basis of second data increase speed 1315, computing device 120 may combine other parameters of second storage device 110-4 to further calculate the usage degree of second storage device 110-4 in a certain aspect.

Therefore, computing device 120 may determine usage metric 1430 of second available storage capacity 1410 based on second available storage capacity 1410 and second data increase speed 1315. For example, computing device 120 may divide second available storage capacity 1410 by second data increase speed 1315, thereby estimating after how long the available storage capacity of second storage device 110-4 will be used up, that is, how soon second storage device 110-4 will be filled up. It should be understood that the time length parameter reflects the degree to which second storage device 110-4 is used in the aspect of available storage capacity. In some embodiments, in the case where second data increase speed 1315 changes, in order to make the time length parameter and the usage degrees of second storage device 110-4 in other aspects have the same change direction (for example, simultaneously increasing as second data increase speed 1315 increases, or simultaneously decreasing as second data increase speed 1315 decreases), computing device 120 may also use the reciprocal of the aforementioned time length parameter to represent the degree to which second storage device 110-4 is used in the aspect of available storage capacity.

Through the example way shown in FIG. 14, computing device 120 may quantitatively determine usage metric 1430 of second available storage capacity 1410 of second storage device 110-4 based on second data increase speed 1315 and second available storage capacity 1410. In this way, the calculation accuracy and effectiveness of the usage degree of second storage device 110-4 in the aspect of available storage capacity may be improved.

Figure 15:
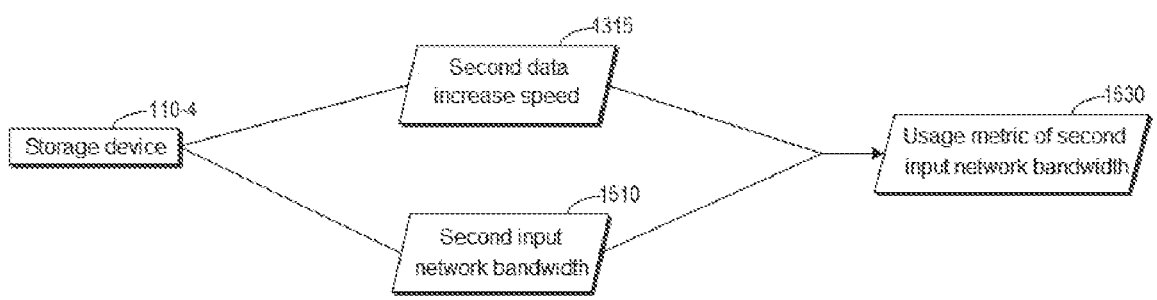
FIG. 15 shows a schematic diagram of determining a usage metric of a second input network bandwidth corresponding to a second storage device according to an embodiment of the present disclosure.

FIG. 15 shows a schematic diagram of determining usage metric 1530 of second input network bandwidth 1510 corresponding to second storage device 110-4 according to an embodiment of the present disclosure. As shown in FIG. 15, as an example way of determining second usage metric 610-4, on the basis of second data increase speed 1315, computing device 120 may further consider second input network bandwidth 1510 of second storage device 110-4 to determine usage metric 1530 of second input network bandwidth 1510 of second storage device 110-4.

Specifically, computing device 120 may determine second input network bandwidth 1510 of second storage device 110-4. For example, computing device 120 may directly obtain second input network bandwidth 1510 of second storage device 110-4 by searching. Of course, computing device 120 may also use any other appropriate method to obtain second input network bandwidth 1510 of second storage device 110-4, which is not limited in the embodiment of the present disclosure.

On the other hand, second data increase speed 1315 indicates the amount of data to be stored in second storage device 110-4 per unit time, and therefore generally reflects the degree to which second storage device 110-4 is used. On the basis of second data increase speed 1315, computing device 120 may combine other parameters of second storage device 110-4 to further calculate the usage degree of second storage device 110-4 in a certain aspect.

Therefore, computing device 120 may determine usage metric 1530 of second input network bandwidth 1510 based on second input network bandwidth 1510 and second data increase speed 1315. For example, computing device 120 may divide second data increase speed 1315 by second input network bandwidth 1510, thereby estimating the network bandwidth usage rate of second storage device 110-4, that is, what percentage of the network bandwidth of second storage device 110-4 will be used. It will be understood that the network bandwidth usage rate parameter reflects the degree to which second storage device 110-4 is used in the aspect of input network bandwidth.

In some embodiments, in the case where second data increase speed 1315 changes, the network bandwidth usage rate and the reciprocal of the time length parameter described above may increase simultaneously as second data increase speed 1315 increases, or decrease simultaneously as second data increase speed 1315 decreases. Therefore, in these embodiments, the network bandwidth usage rate and the reciprocal of the time length parameter may be used in combination to evaluate the usage degree of second storage device 110-4, that is, second usage metric 610-4.

Through the example way shown in FIG. 15, computing device 120 may quantitatively determine usage metric 1530 of second input network bandwidth 1510 of second storage device 110-4 based on second data increase speed 1315 and second input network bandwidth 1510. In this way, the calculation accuracy and effectiveness of the usage degree of second storage device 110-4 in the aspect of input network bandwidth may be improved.

The foregoing describes some embodiments of the technical solution of the present disclosure with reference to FIGS. 1 to 15. In order to better illustrate an example application scenario of the embodiments of the present disclosure, an application example of the technical solution of the present disclosure in an example scenario will be described later with reference to FIG. 16.

Figure 16:
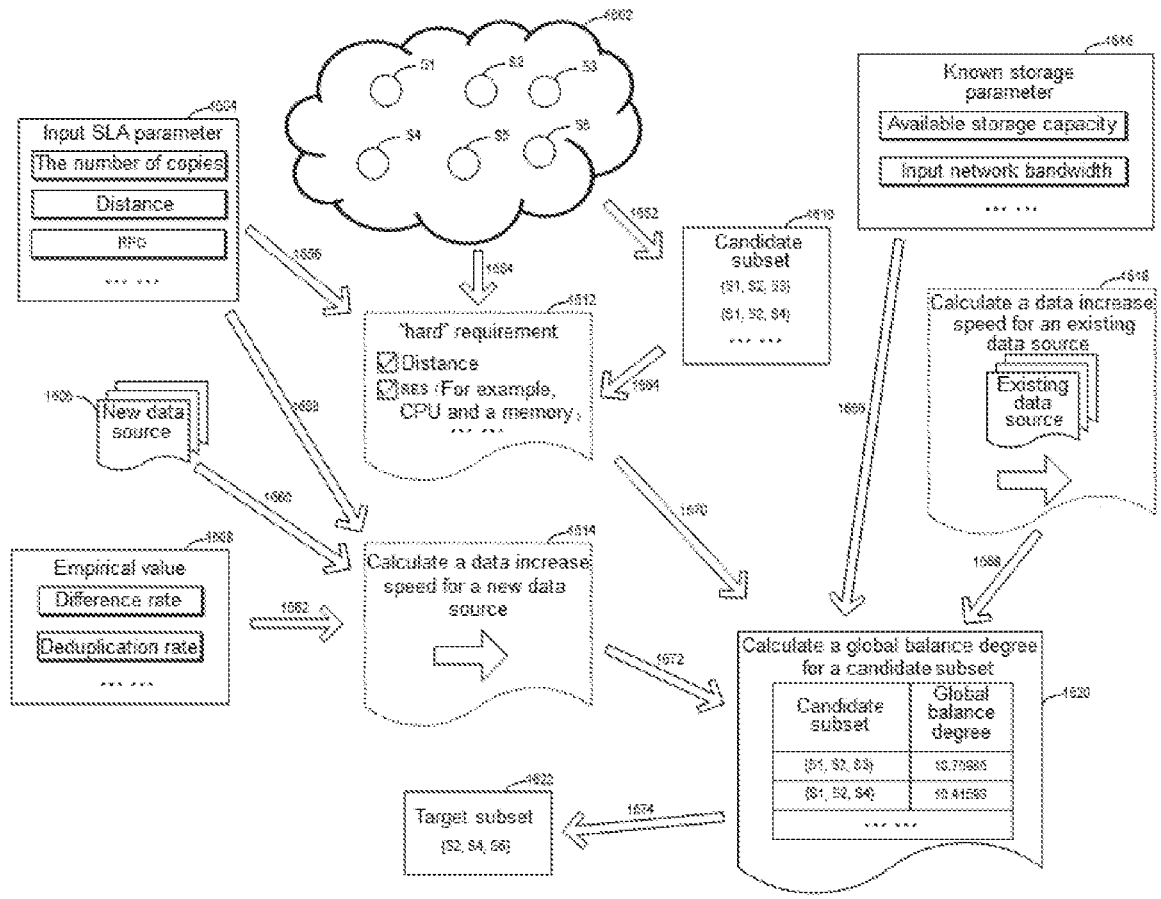
FIG. 16 shows an example operation process of selecting a subset of storage devices for data backup in a storage device set according to an embodiment of the present disclosure.

FIG. 16 shows an example operation process of selecting subset (target subset) 1622 of storage devices used for data backup in storage device set 1602 according to an embodiment of the present disclosure. In the example of FIG. 16, storage device set 1602 of a storage system may include T=6 storage devices (for example, backup sites) S1 to S6, which are schematically depicted as located in a network and connected in a communication manner through the network to provide data backup services. As shown in FIG. 16, there is currently new data source 1606, also known as new data asset 1606, data backup needs to be performed through the storage devices in storage device set 1602, and a user has input service level agreement (SLA) parameter 1604 for new data source 1606. For example, SLA parameter 1604 may indicate a data source that needs to be protected, and include the number of data copies required, a threshold distance between the data copies, a recovery point objective (RPO), and so on.

In the following, new data source 1606 to be backed up is not considered first, and then based on the technical solution of the present disclosure described above, a global balance degree function GE (also referred to as a global evaluation function) is created for storage device set 1602, which may be an implementation of the global balance degree described above. In some embodiments, the global balance degree function GE may be used to evaluate the global balance degree corresponding to the candidate subsets and provide corresponding evaluation scores. That is to say, the global balance degree function GE may be used to calculate the global balance degrees corresponding to various candidate subsets for the backup of new data source 1606, thereby selecting the candidate subset with the optimal global balance degree as target subset 1622. In addition, the storage system may periodically calculate the global balance degree function GE to check whether the storage system is balanced.

In order to create the global balance degree function GE, it can be assumed that the geographic locations (for example, latitudes and longitudes), remaining capacities, and input network bandwidths of storage devices S1 to S6 in the storage system are known. In addition, an empirical value of a difference rate between data copies of an existing backup task on storage devices S1 to S6 and an empirical value of a deduplication rate of the data copies are known. Specifically, the creation of the global balance degree function GE requires the above-mentioned parameters in the storage system and the above-mentioned empirical values of the storage system under current conditions. For example, using symbolic expressions, the above-mentioned parameters may be expressed as: remaining capacities $RC_t$ of the storage devices, input network bandwidths $NB_t$ of the storage devices, and a total number T (T=6 in the example in FIG. 16) of the storage devices, where t represents a certain storage device.

In addition, a data increase speed at the back end caused by an existing backup strategy (that is, the existing backup task described above) on the storage devices may be expressed as $VE_t$. In some embodiments, $VE_t$ may be calculated from the size of source data and the aforementioned empirical values. For example, the size of the source data to be copied may be expressed as $SDS_s$, for example, it is assumed to be 1000 GB. A front-end daily data growth rate $DDI_t$ may be collected from an RPO of an existing backup at the front end, for example, it is assumed to be 4 hours, that is, 6 data copies a day. Furthermore, the difference rate between two adjacent data copies is assumed to be, for example, 5%. Then, the storage system may obtain $DDI_t=0.3$ per day. Further, the empirical value of the deduplication rate DR of the storage system may be assumed to be 50 times.

Under the condition of the above assumed values, a back-end daily data increase speed $VE_t$ may be expressed as:

$$VE_t = \sum_{s=1}^{n} \frac{SDS_s * DDI_t}{DR}$$

where n represents the number of source data that need to be protected. For simplicity, it is assumed that there is only one $SDS_s$ in this example, and $VE_t$ will be determined as 6 GB per day.

Based on $VE_t$, in the aspect of the available storage capacity, the storage system may define $ETFR_t$ for each storage device, which means "estimated time to be filled (reciprocal)":

$$ETFR_t = \frac{VE_t}{RC_t}$$

Then, the storage system may define σ1 as the standard deviation of $ETFR_t$:

$$\sigma 1 = \sqrt{\frac{\sum_{t=1}^{t} (ETFR_t - \overline{ETFR})^2}{T}}$$

In addition, based on $VE_t$, in the aspect of the input network bandwidth, the storage system may define $ETC_t$ for each storage device, which means a "network bandwidth occupancy rate" or "estimated completion time":

$$ETC_t = \frac{VE_t}{NB_t}$$

Then, the storage system may define σ2 as the standard deviation of $ETC_t$:

$$\sigma 2 = \sqrt{\frac{\sum_{t=1}^{T} (ETC_t - \overline{ETC})^2}{T}}$$

Therefore, the global balance degree function GE may be defined as:

$$GE = \sigma 1 * v1 + \sigma 2 * v2 + v3$$

Here, v1 and v2 are custom weights to indicate which of σ1 and σ2 is more important to the user, and v3 is an added value to make the result fall within a desired range.

It should be noted that the global balance degree function GE is extensible, and more considerations may be added as needed. In addition, it should be noted that the global balance degree function GE may represent the global balance degree of the entire storage system. Therefore, the storage system may periodically calculate the global balance degree function GE, and compare results to see if the storage system is running smoothly. The smaller the value of GE, the more balanced use of resources by the storage system.

Next, new data source 1606 to be protected and copied is considered to be added. To this end, the storage system needs to consider factors such as the number R of data copies required by the user, a threshold distance that a distance between any two copies should be greater than, a distance DIST (t1, t2) between storage device t1 and storage device t2, a speed V (e.g., a calculation method thereof may be the same as $VE_t$) at which data copies of new data source 1606 need to be added, and $RES_t$. $RES_t$ may indicate remaining resources on the storage devices other than $RC_t$ and $NB_t$, such as a CPU and a memory. These resources may lead to the capacity of the storage devices to handle more data backup requests.

As shown in FIG. 16, the storage system may first select (1652) R storage devices from T storage devices (in the example of FIG. 16, R=3), thereby obtaining candidate subset 1610. This is a combination problem mathematically, so the number of combinations in candidate subset 1610 may be calculated as follows:

$$S = C_R^T = \binom{T}{R} = \frac{T!}{R! * (T-R)!}$$

From these S combinations, the storage system needs to exclude combinations that do not meet "hard" requirement 1612, that is, "hard" requirement 1612 is used to filter (1664) candidate subset 1610. For example, "hard" requirement 1612 may include a distance (i.e., the threshold distance) and RES, where the distance may be specified by SLA parameter 1604 (1656), and RES may be obtained (1654) from storage device set 1602. Specifically, the storage system may use DIST(t1, t2) to calculate a distance between two storage devices. If the distance between any two storage devices in the combination is less than the specified threshold distance, the storage system may discard the combination. In addition, RES describes the capacity that each storage device can handle. If a load more than V is added to the storage device, the storage device may not be able to handle the load and need to give up the load, which means that the capacity of the storage device has been used up. In other words, the storage device cannot handle more backup requests. Therefore, the relationship between RES and $VE_c$ and V may be defined as follows:

$$(VE_t + V) * v4 > RES_t$$

where v4 is an empirical value and may also be set by the user.

It should be noted that "hard" requirement 1612 in the embodiment of the present disclosure is extensible. When there is a new "hard" requirement, the storage system may add the new "hard" requirement to "hard" requirement 1612.

Then, for the remaining combinations that meet the requirements of the threshold distance and $RES_t$, for example, for a candidate subset that meets (1670) the requirement through the filtering with "hard" requirement 1612, corresponding global balance degree 1620 may be calculated, which is expressed as E for differentiation from the above GE. For example, the storage device may calculate data increase speed 1614, denoted as V, for new data source 1606 based on the RPO provided (1658) by SLA parameter 1604, the source data size provided (1660) by new data source 1606, and related empirical values (for example, including the data difference rate and the data deduplication rate) provided (1662) by empirical value 1608.

A formula used to calculate the global balance degree E when considering new data source 1606 is generally similar to the formula used to calculate the GE, except that the storage device selected for data backup needs to add V to $VE_t$. Therefore, the storage system also needs data increase speed 1614 of new data source 1606 to provide (1672) calculation parameters, known storage parameter 1616 to provide (1666) related parameters (for example, including the available storage capacity, the input network bandwidth, etc.), and data increase speed 1618 of an existing data source to provide (1668) calculation parameters. The specific calculation formula of the global balance degree E is as follows. After calculating all the combinations, the storage system may find an optimal solution according to the viewpoint of static analysis.

$$ETFR_t = \begin{cases} \frac{VE_t}{RC_t} \text{when the storage device is not selected} \\ \frac{VE_t + V}{RC_t} \text{when the storage device is selected} \end{cases}$$

$$ETC_t = \begin{cases} \frac{VE_t}{NB_t} \text{when the storage device is not selected} \\ \frac{VE_t + V}{NB_t} \text{when the storage device is selected} \end{cases}$$

$$E = \sqrt{\frac{\sum_{t=1}^{T}(ETFR_t - \overline{ETFR})^2}{T}} * v1 + \sqrt{\frac{\sum_{t=1}^{T}(ETC_t - \overline{ETC})^2}{T}} * v2 + v3$$

As an example, it is assumed that all the combinations meet the requirements of the threshold distance and $RES_t$. The values of the remaining capacity $RC_t$ and the input network bandwidth $NB_t$ of each storage device are shown in Table 1 below.

TABLE 1

|  | $VE_t$ (GB/day) | $RC_t$ (GB) | $NB_t$ (GB/s) | $VE_t$ (GB/s) |
| --- | --- | --- | --- | --- |
| Storage device 1 (s1) | 150 | 18,000 | 0.1 | 0.001736 |
| Storage device 2 (s2) | 80 | 16,000 | 0.1 | 0.000926 |
| Storage device 3 (s3) | 260 | 23,000 | 0.1 | 0.003009 |
| Storage device 4 (s4) | 80 | 8,000 | 0.1 | 0.000926 |
| Storage device 5 (s5) | 100 | 12,000 | 0.1 | 0.001157 |
| Storage device 6 (s6) | 90 | 15,000 | 0.1 | 0.001042 |

In addition, assuming v1=v2=1,000 and v3=0, then the global balance degree GE may be calculated as: GE=σ1*v1+σ2*v2+v3=σ1+σ2=10.50608757.

When new data source 1606 is added, assuming R=3 and V=6 GB/day, then the global balance degree E of the S combinations may be calculated as shown in Table 2.

TABLE 2

| Combination of storage devices S | Global balance degree |
| --- | --- |
| {s1, s2, s3} | 10.70986 |
| {s1, s2, s4} | 10.41593 |
| {s1, s2, s5} | 10.3372 |
| {s1, s2, s6} | 10.23019 |
| {s1, s3, s4} | 10.92993 |
| {s1, s3, s5} | 10.8569 |
| {s1, s3, s6} | 10.75673 |
| {s1, s4, s5} | 10.56127 |
| {s1, s4, s6} | 10.4628 |
| {s1, s5, s6} | 10.38543 |

TABLE 2-continued

| Combination of storage devices S | Global balance degree |
|---|---|
| {s2, s3, s4} | 10.69596 |
| {s2, s3, s5} | 10.61905 |
| {s2, s3, s6} | 10.51496 |
| {s2, s4, s5} | 10.31954 |
| {s2, s4, s6} | 10.21738 |
| {s2, s5, s6} | 10.23536 |
| {s3, s4, s5} | 10.83781 |
| {s3, s4, s6} | 10.74165 |
| {s3, s5, s6} | 10.66602 |
| {s4, s5, s6} | 10.36655 |

It can be found from Table 2 that the candidate subset {s2, s4, s6} has the highest global balance degree. Therefore, when the user needs three data copies, that is, when three storage devices need to be selected, the candidate subset {s2, s4, s6} is the optimal solution of storage device set 1602, i.e., {s1, s2, s3, s4, s5, s6}. Based on this, the storage system may determine (1674) target subset 1622 to be {s2, s4, s6} based on global balance degree 1620 of the candidate subset. When new data source 1606 is added to the storage system, if {s2, s4, s6} is selected as the backup storage device, the storage system will become more balanced than other combinations when used for data backup.

As can be seen from the example in FIG. 16, the technical solution of the present disclosure provides an intelligent way (for example, when creating a location SLA) to suggest storage devices (or storage sites) for data backup and plan routing, which can then be converted into a backup strategy. Therefore, when the user owns a large number of storage devices in different storage sites, the technical solution of the present disclosure can greatly reduce the operation burden of the user (or administrator).

Specifically, the technical solution of the present disclosure can help the user to easily select storage devices for data backup. In contrast, when there are many storage devices to choose from, it will be difficult for users using conventional methods to operate. If the technical solution of the present disclosure is used to suggest storage devices and routing plans for data backup to users, this will introduce more intelligence to the storage system, thereby reducing manual work of the users, and being easy to use. In addition, to meeting the hard requirement (such as the threshold distance), the technical solution of the present disclosure can also introduce more intelligence on the balanced use of the network bandwidth and the storage capacity. In other words, the technical solution of the present disclosure can also balance the use of resources, for example, balance the use of remaining storage capacities and network bandwidths.

Figure 17:
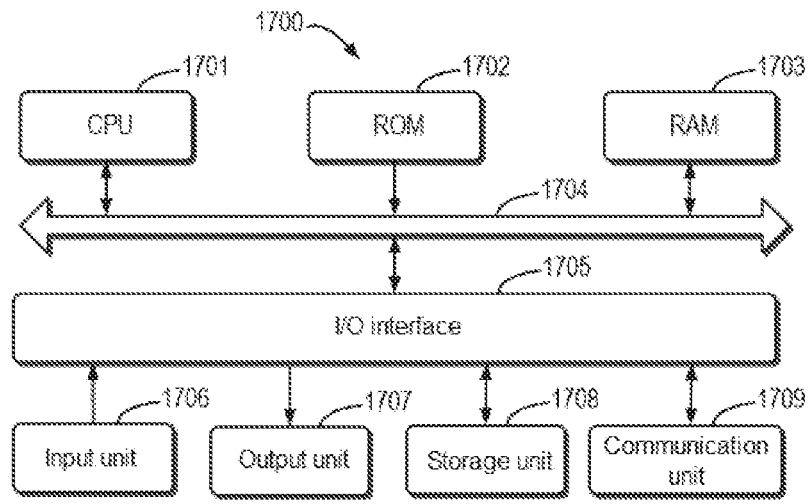
FIG. 17 shows a block diagram of an example device that can be configured to implement an embodiment of the present disclosure.

FIG. 17 schematically shows a block diagram of example device 1700 that can be configured to implement an embodiment of the present disclosure. In some embodiments, example device 1700 may be an electronic device, which may be configured to implement computing device 120 in FIG. 1. As shown in FIG. 17, example device 1700 includes central processing unit (CPU) 1701 which may execute various appropriate actions and processing in accordance with computer program instructions stored in read-only memory (ROM) 1702 or computer program instructions loaded onto random access memory (RAM) 1703 from storage unit 1708. Various programs and data required for operations of example device 1700 may also be stored in RAM 1703. CPU 1701, ROM 1702, and RAM 1703 are connected to each other through bus 1704. Input/output (I/O) interface 1705 is also connected to bus 1704.

Multiple components in example device 1700 are connected to I/O interface 1705, including: input unit 1706, such as a keyboard or a mouse; output unit 1707, such as various types of displays or speakers; storage unit 1708, such as a magnetic disk or an optical disk; and communication unit 1709, such as a network card, a modem, or a wireless communication transceiver. Communication unit 1709 allows example device 1700 to exchange information/data with other devices over a computer network such as the Internet and/or various telecommunication networks.

The various processes and processing described above, such as example methods or example processes, may be performed by processing unit 1701. For example, in some embodiments, various example methods or example processes may be implemented as a computer software program that is tangibly contained in a machine-readable medium such as storage unit 1708. In some embodiments, part or all of the computer program may be loaded and/or installed onto example device 1700 via ROM 1702 and/or communication unit 1709. When the computer program is loaded onto RAM 1703 and executed by CPU 1701, one or more steps of the example methods or example processes described above may be performed.

As used herein, the term "include" and similar terms thereof should be understood as open-ended inclusion, i.e., "including but not limited to." The term "based on" should be understood as "based at least in part on." The term "one embodiment" or "this embodiment" should be understood as "at least one embodiment." The terms "first," "second," etc. may refer to different or the same objects. Other explicit and implicit definitions may also be included herein.

As used herein, the term "determine" encompasses a variety of actions. For example, "determine" may include operating, computing, processing, exporting, surveying, searching (for example, searching in a table, a database, or another data structure), identifying, and the like. In addition, "determine" may include receiving (for example, receiving information), accessing (for example, accessing data in a memory), and the like. In addition, "determine" may include parsing, selecting, choosing, establishing, and the like.

It should be noted that the embodiments of the present disclosure may be implemented by hardware, software, or a combination of software and hardware. The hardware part can be implemented using dedicated logic; the software part can be stored in a memory and executed by an appropriate instruction execution system, such as a microprocessor or dedicated design hardware. Those skilled in the art can understand that the above-mentioned devices and methods can be implemented by using computer-executable instructions and/or by being included in processor control code, and for example, the code is provided on a programmable memory or a data carrier such as an optical or electronic signal carrier.

In addition, although the operations of the method of the present disclosure are described in a specific order in the drawings, this does not require or imply that these operations must be performed in the specific order, or that all the operations shown must be performed to achieve the desired result. Rather, the order of execution of the steps depicted in the flowchart can be changed. Additionally or alternatively, some steps may be omitted, multiple steps may be combined into one step for execution, and/or one step may be decomposed into multiple steps for execution. It should also be noted that the features and functions of two or more apparatuses according to the present disclosure may be embodied in one apparatus. On the contrary, the features and functions of one apparatus described above can be embodied by further dividing the apparatus into a plurality of apparatuses.

Although the present disclosure has been described with reference to several specific embodiments, it should be understood that the present disclosure is not limited to the specific embodiments disclosed. The present disclosure is intended to cover various modifications and equivalent arrangements included within the spirit and scope of the appended claims.

The invention claimed is:

1. A storage management method, comprising:
   determining, in a storage device set, a plurality of candidate subsets of storage devices used for data backup, wherein the plurality of candidate subsets comprises substantially a same number of storage devices;
   determining global balance degrees respectively corresponding to the plurality of candidate subsets, wherein each of the global balance degrees indicates a usage balance degree of the storage device set when storage devices in a corresponding candidate subset are used for the data backup; and
   determining a target subset of storage devices used for the data backup in the plurality of candidate subsets based on the global balance degrees.

2. The method according to claim 1,
   wherein a first global balance degree in the global balance degrees corresponds to a first candidate subset in the plurality of candidate subsets, and
   wherein determining the global balance degrees comprises:
      determining a first group of usage metrics, wherein usage metrics in the first group of usage metrics correspond to storage devices in the first candidate subset;
      determining a second group of usage metrics, wherein usage metrics in the second group of usage metrics correspond to storage devices outside the first candidate subset, respectively; and
      determining the first global balance degree based on the first group of usage metrics and the second group of usage metrics.

3. The method according to claim 2,
   wherein a first usage metric in the first group of usage metrics corresponds to a first storage device in the first candidate subset, and
   wherein determining the first group of usage metrics comprises:
      determining a first data increase speed associated with a first existing backup task of the first storage device;
      determining an additional data increase speed associated with the data backup; and
      determining the first usage metric based on the first data increase speed and the additional data increase speed.

4. The method according to claim 3, wherein determining the first data increase speed comprises:
   determining the first data increase speed based on a backup data size, a data increase rate, and a data deduplication rate of the first existing backup task.

5. The method according to claim 3, wherein determining the additional data increase speed comprises:
   determining the additional data increase speed based on a backup data size, a data increase rate, and a data deduplication rate of the data backup.

6. The method according to claim 2, wherein determining a first usage metric in the first group of usage metrics comprises:
   determining a first available storage capacity of a first storage device;
   determining a total data increase speed based on a first data increase speed and an additional data increase speed; and
   determining a usage metric of the first available storage capacity based on the first available storage capacity and the total data increase speed.

7. The method according to claim 2, wherein determining a first usage metric in the first group of usage metrics comprises:
   determining a first input network bandwidth of a first storage device;
   determining a total data increase speed based on a first data increase speed and an additional data increase speed; and
   determining a usage metric of the first input network bandwidth based on the first input network bandwidth and the total data increase speed.

8. The method according to claim 2,
   wherein a second usage metric in the second group of usage metrics corresponds to a second storage device in the storage devices outside the first candidate subset, and
   wherein determining the second group of usage metrics comprises:
      determining a second data increase speed associated with a second existing backup task of the second storage device; and
      determining the second usage metric based on the second data increase speed.

9. The method according to claim 8, wherein determining the second usage metric comprises:
   determining a second available storage capacity of the second storage device; and
   determining a usage metric of the second available storage capacity based on the second available storage capacity and the second data increase speed.

10. The method according to claim 8, wherein determining the second usage metric comprises:
    determining a second input network bandwidth of the second storage device; and
    determining a usage metric of the second input network bandwidth based on the second input network bandwidth and the second data increase speed.

11. The method according to claim 8, wherein determining the second data increase speed comprises:
    determining the second data increase speed based on a backup data size, a data increase rate, and a data deduplication rate of the second existing backup task.

12. The method according to claim 1, wherein determining the plurality of candidate subsets comprises:
    determining a number of data copies required for the data backup;
    determining a plurality of initial candidate subsets from the storage device set based on the number of data copies; and
    selecting the plurality of candidate subsets from the plurality of initial candidate subsets based on a predetermined performance requirement for the plurality of candidate sub sets.

13. The method according to claim 12, wherein a number of storage devices in the plurality of initial candidate subsets is equal to the number of data copies.

14. The method according to claim 12, wherein the predetermined performance requirement comprises at least one of the following:

a distance between any two storage devices in each candidate subset of the plurality of candidate subsets being greater than a threshold distance; and an amount of available resources of any storage device in the plurality of candidate subsets being greater than a threshold amount of resources.

15. The method according to claim 1, wherein determining the target subset comprises:

determining, in the global balance degrees, a target global balance degree higher than a threshold balance degree; and determining a candidate subset corresponding to the target global balance degree as the target subset.

16. An electronic device, comprising:

at least one processor; and at least one memory storing computer program instructions, wherein the at least one memory and the computer program instructions are configured to cause, along with the at least one processor, the electronic device to:

determine, in a storage device set, a plurality of candidate subsets of storage devices used for data backup, wherein the plurality of candidate subsets comprises substantially a same number of storage devices;

determine global balance degrees respectively corresponding to the plurality of candidate subsets, wherein each of the global balance degrees indicates a usage balance degree of the storage device set when storage devices in a corresponding candidate subset are used for the data backup; and determine a target subset of storage devices used for the data backup in the plurality of candidate subsets based on the global balance degrees.

17. The electronic device according to claim 16, wherein a first global balance degree in the global balance degrees corresponds to a first candidate subset in the plurality of candidate subsets, and wherein the at least one memory and the computer program instructions are configured to cause, along with the at least one processor, the electronic device to determine the global balance degrees by:

determining a first group of usage metrics, wherein usage metrics in the first group of usage metrics correspond to storage devices in the first candidate subset;

determining a second group of usage metrics, wherein usage metrics in the second group of usage metrics correspond to storage devices outside the first candidate subset; and determining the first global balance degree based on the first group of usage metrics and the second group of usage metrics.

18. The electronic device according to claim 17, wherein a first usage metric in the first group of usage metrics corresponds to a first storage device in the first candidate subset, and wherein the at least one memory and the computer program instructions are configured to cause, along with the at least one processor, the electronic device to determine the first group of usage metrics by:

determining a first data increase speed associated with a first existing backup task of the first storage device;

determining an additional data increase speed associated with the data backup; and determining the first usage metric based on the first data increase speed and the additional data increase speed.

19. The electronic device according to claim 18, wherein the at least one memory and the computer program instructions are configured to cause, along with the at least one processor, the electronic device to determine the first usage metric by:

determining a first available storage capacity of the first storage device;

determining a total data increase speed based on the first data increase speed and the additional data increase speed; and determining a usage metric of the first available storage capacity based on the first available storage capacity and the total data increase speed.

20. A computer program product tangibly stored on a non-volatile computer-readable medium and comprising machine-executable instructions, wherein the machine-executable instructions, when executed, cause a machine to perform a method, the method comprising determining, in a storage device set, a plurality of candidate subsets of storage devices used for data backup, wherein the plurality of candidate subsets comprises substantially a same number of storage devices;

determining global balance degrees respectively corresponding to the plurality of candidate subsets, wherein each of the global balance degrees indicates a usage balance degree of the storage device set when storage devices in a corresponding candidate subset are used for the data backup; and determining a target subset of storage devices used for the data backup in the plurality of candidate subsets based on the global balance degrees.

* * * * *